(12) United States Patent
Kim et al.

(10) Patent No.: US 7,565,138 B2
(45) Date of Patent: Jul. 21, 2009

(54) METHOD FOR MANAGING SERVICE CONTEXT FOR PAGING USER EQUIPMENT IN A MULTIMEDIA BROADCAST/MULTICAST SERVICE

(75) Inventors: Eun-Jung Kim, Suwon-si (KR); Kook-Heui Lee, Yongin-si (KR); Sung-Ho Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1144 days.

(21) Appl. No.: 10/776,360

(22) Filed: Feb. 11, 2004

(65) Prior Publication Data
US 2004/0185837 A1    Sep. 23, 2004

(30) Foreign Application Priority Data

| Feb. 12, 2003 | (KR) | .................... 10-2003-0008934 |
| Mar. 31, 2003 | (KR) | .................... 10-2003-0020275 |
| Apr. 14, 2003 | (KR) | .................... 10-2003-0023355 |
| May 16, 2003 | (KR) | .................... 10-2003-0031354 |

(51) Int. Cl.
*H04B 7/00* (2006.01)
*H04L 12/66* (2006.01)
*H04L 29/06* (2006.01)
*H04Q 7/20* (2006.01)

(52) U.S. Cl. .................... 455/414.3; 370/353; 370/355; 455/445; 455/452.2; 455/458; 455/516; 455/517

(58) Field of Classification Search .............. 455/435.2, 455/560, 458, 414.3, 445, 452.2, 516, 517; 370/352, 353, 355
See application file for complete search history.

(56) References Cited

U.S. PATENT DOCUMENTS

| 6,157,815 A | 12/2000 | Collins et al. |
| 6,374,112 B1* | 4/2002 | Widegren et al. ........ 455/452.2 |
| 6,701,155 B2* | 3/2004 | Sarkkinen et al. ........... 455/515 |
| 7,031,708 B2* | 4/2006 | Sarkkinen et al. ........... 455/436 |
| 7,089,023 B2* | 8/2006 | Vialen et al. ................ 455/458 |

(Continued)

FOREIGN PATENT DOCUMENTS

EP    1 359 774    11/2003

(Continued)

OTHER PUBLICATIONS

"Evolution of the GSM Platform Towards UMTS, UMTS 23.20 version 1.6.1; DTR/SMG-032320U", 1999.

(Continued)

*Primary Examiner*—Fan Tsang
*Assistant Examiner*—Lisa Hashem
(74) *Attorney, Agent, or Firm*—The Farrell Law Firm, LLP

(57) ABSTRACT

A method for managing information on user equipments (UEs) in a mobile communication system supporting an MBMS (Multimedia Broadcast/Multicast Service) service. A radio network controller (RNC) provides a packet switched (PS) service and a circuit switched (CS) service to the UEs. A UE that is in a Packet Mobility Management-Idle (PMM-Idle) mode after joining at least one MBMS service, transmits MBMS service-related information thereof to the RNC, and the RNC stores the MBMS service-related information in a first service context for the MBMS service held in the RNC, together with information on the UE.

29 Claims, 25 Drawing Sheets

U.S. PATENT DOCUMENTS

| | | | |
|---|---|---|---|
| 7,149,195 B2* | 12/2006 | Kall et al. | 370/328 |
| 7,266,372 B2* | 9/2007 | Moon et al. | 455/422.1 |
| 7,395,076 B2* | 7/2008 | Kim et al. | 455/458 |
| 7,400,593 B2* | 7/2008 | Choi et al. | 370/310 |
| 2001/0034228 A1* | 10/2001 | Lehtovirta et al. | 455/424 |
| 2001/0036823 A1 | 11/2001 | Van Lieshout et al. | |
| 2003/0050097 A1* | 3/2003 | Amirijoo et al. | 455/560 |
| 2003/0119452 A1* | 6/2003 | Kim et al. | 455/69 |
| 2003/0174645 A1 | 9/2003 | Paratainen et al. | |
| 2003/0194992 A1* | 10/2003 | Kim et al. | 455/414.1 |
| 2003/0223394 A1 | 12/2003 | Paratainen et al. | |
| 2003/0224794 A1* | 12/2003 | Kim et al. | 455/445 |
| 2004/0008657 A1* | 1/2004 | Lee et al. | 370/342 |
| 2004/0022218 A1* | 2/2004 | Kim et al. | 370/335 |
| 2004/0142706 A1* | 7/2004 | Kim et al. | 455/458 |
| 2004/0152473 A1* | 8/2004 | Kuwano et al. | 455/456.2 |
| 2005/0007971 A1* | 1/2005 | Jeong et al. | 370/312 |
| 2005/0015583 A1* | 1/2005 | Sarkkinen et al. | 713/150 |
| 2005/0053062 A1* | 3/2005 | Kall et al. | 370/389 |
| 2005/0118992 A1* | 6/2005 | Jeong et al. | 455/422.1 |
| 2005/0282569 A1* | 12/2005 | Kim et al. | 455/502 |
| 2006/0030342 A1* | 2/2006 | Hwang et al. | 455/466 |
| 2006/0107287 A1* | 5/2006 | Lee et al. | 725/32 |
| 2006/0140159 A1* | 6/2006 | Choi et al. | 370/336 |
| 2006/0154627 A1* | 7/2006 | Wang et al. | 455/130 |
| 2006/0165027 A1* | 7/2006 | Heden | 370/328 |
| 2006/0268838 A1* | 11/2006 | Larsson et al. | 370/352 |
| 2006/0285512 A1* | 12/2006 | Lee et al. | 370/328 |
| 2007/0191018 A1* | 8/2007 | Terry | 455/450 |
| 2007/0197235 A1* | 8/2007 | Zhang | 455/466 |
| 2007/0218930 A1* | 9/2007 | Kuo | 455/466 |
| 2007/0232308 A1* | 10/2007 | Bergstrom et al. | 455/436 |
| 2007/0275742 A1* | 11/2007 | Zhang | 455/466 |
| 2007/0293249 A1* | 12/2007 | Wang | 455/466 |
| 2008/0020762 A1* | 1/2008 | Fischer | 455/435.1 |
| 2008/0057961 A1* | 3/2008 | Sun et al. | 455/436 |
| 2008/0267152 A1* | 10/2008 | Alnas et al. | 370/338 |

FOREIGN PATENT DOCUMENTS

WO      WO 02/43429      5/2002

OTHER PUBLICATIONS

"Ericsson: MBMS Scenarios for UE in PMM Idle RRC Connected", 3GPP TSG-RAN3 Meeting #40, Jan. 12, 2004.

"Universal Mobile Telecommunications System (UMTS); Multimedia Broadcast/Multicast Service (MBMS); Stage 1 (3GPP TS 22.146 version 5.2.0. Release 5); ETSI TS 122 146", Mar. 2002.

* cited by examiner

METHOD FOR MANAGING SERVICE CONTEXT FOR PAGING USER EQUIPMENT IN A MULTIMEDIA BROADCAST/MULTICAST SERVICE

PRIORITY

This application claims priority under 35 U.S.C. § 119 to an application entitled "Method for Managing Service Context for Paging User Equipment in a Multimedia Broadcast/Multicast Service" filed in the Korean Intellectual Property Office on Feb. 12, 2003 and assigned Serial No. 2003-8934, an application entitled "Method for Managing Service Context for Paging User Equipment in a Multimedia Broadcast/Multicast Service" filed in the Korean Intellectual Property Office on Mar. 31, 2003 and assigned Serial No. 2003-20275, an application entitled "Method for Managing Service Context for Paging User Equipment in a Multimedia Broadcast/Multicast Service" filed in the Korean Intellectual Property Office on Apr. 14, 2003 and assigned Serial No. 2003-23355, an application entitled "Method for Managing Service Context for Paging User Equipment in a Multimedia Broadcast/Multicast Service" filed in the Korean Intellectual Property Office on May 16, 2003 and assigned Serial No. 2003-31354, the contents of all of which are incorporated herein by reference.

BACKGROUND OF THE INVENTION

1. Field of the Invention

The present invention relates generally to a Multimedia Broadcast/Multicast Service (MBMS), and in particular, to a method for managing an MBMS service context for an MBMS.

2. Description of the Related Art

Recently, due to the development of communication technology, a service provided in a Wideband Code Division Multiple Access (WCDMA) mobile communication system is developing into multimedia broadcast/communication capable of supporting an existing voice service and also packet service and multimedia service that transmit mass data, such as packet data and circuit data. In order to support the multimedia broadcast/communication, an MBMS service has been proposed, in which a particular service is provided from one or several data sources to a plurality of user equipments (UEs).

The "MBMS service" refers to a service for transmitting the same multimedia data to a plurality of recipients through a radio network. In the MBMS service, recipients can share one radio channel to save radio transmission resources. The MBMS service supports transmission of multimedia data such as real-time image and voice, still image, and text, and can simultaneously transmit voice data and image data according to a type of the multimedia transmission. As such, the MBMS service requires massive transmission resources. Further, because the same data must be transmitted to a plurality of cells where users are located, connections are made on a point-to-point (PtP) basis or a point-to-multipoint (PtM) basis, based on the number of users located on each cell.

FIG. 1 is a diagram schematically illustrating nodes joining an MBMS service in a mobile communication network. Referring to FIG. 1, UEs 161, 162, 163, 171, and 172 are terminal equipments or subscribers for receiving an MBMS service, and a cell #1 160 and a cell #2 170 are controlled by their own base station apparatuses or Node Bs, which wirelessly transmit MBMS-related data to subscribers. A radio network controller (RNC) 140 controls the cells 160 and 170, selectively transmits multimedia data to a particular cell, and controls a radio channel set up to provide an MBMS service. Connection between the RNC 140 and the UEs 161 and 172 are called "radio resource control (RRC) interfaces."

The RNC 140 is connected to a packet switched or packet service (PS) network such as the Internet by a serving GPRS (General Packet Radio Service) support node (SGSN) 130. Communication between the RNC 140 and the PS network is achieved by packet switched (PS) signaling. Particularly, a connection between the RNC 140 and the SGSN 130 is called an "Iu-PS interface."

The SGSN 130 controls an MBMS service for each subscriber. For example, typical functions of the SGSN 130 include managing service accounting-related information of each subscriber and selectively transmitting multimedia data to the particular RNC 140.

A transit network (NW) 120 provides a communication path between a broadcast multicast service center (BM-SC) 110 and the SGSN 130, and can be connected to an external network via an undepicted gateway GPRS support node (GGSN). The BM-SC 110 is a source of MBMS data, and controls scheduling of MBMS data.

The RNC 140 is connected to a circuit switched (CS) network by a mobile switching center (MSC) 150. The "CS network" is a connection-based voice-oriented legacy communication network. Communication between the RNC 140 and the MSC 150, and is achieved by circuit switched (CS) signaling. Particularly, a connection between the RNC 140 and the MSC 150 is called an "Iu-CS interface." An MBMS data stream is transferred to the UEs 161, 162, 163, 171, and 172 via the transit network 120, the SGSN 130, the RNC 140, and the Node Bs 160 and 170.

Although not illustrated in FIG. 1, for one MBMS service, a plurality of SGSNs and a plurality of RNCs for each SGSN can be used. Each of the SGSNs selectively transmits data to its RNCs, and each of the RNCs selectively transmits data to its cells. A list of nodes to which a data stream should be transmitted is stored in the SGSN and RNC (i.e., a list of RNCs is stored in each SGSN, and a list of cells is stored in each RNC), to later selectively transmit MBMS data only to the nodes stored in the list.

In order for UEs to access a network and receive a service therefrom, a context, which is a set of information necessary for providing the corresponding service, must be first created between the UEs and network nodes. A UE context and an MM (Mobility Management) context are conventional examples of a context.

An RNC creates a UE context for UEs after setting up RRC connection. The UE context includes fundamental information such as a UE identity (ID), position information of a UE, RRC state information of the UE, and information on a radio resource assigned to the UE. Further, the UE context is managed by an RNC while RRC connection is activated.

The MM context is used to manage a position of a UE in a core network (CN). In order for a UE to receive a PS service, an MM context of the UE must be first created in an SGSN and a GGSN through a GPRS Attach procedure. Particularly, an MM context of the SGSN includes UE ID such as IMSI (International Mobile Subscriber Identity), P-TMSI (Temporary Mobile Subscriber Identity), IMEI (International Mobile Equipment Identity), and MS-ISDN (Mobile Subscriber ISDN (Integrated Switched Data Network)) Number, position information such as RA (Routing Area) and SAC (Service Area Code), authentication/encryption-related information, accounting information, and DRX (Discontinuous Reception) parameters.

Network nodes, such as an RNC, an MSC, and an SGSN manage a state of a UE for efficient signaling transmission and data transmission. In particular, the RNC manages an RRC state of a UE, and the RRC state is determined according to an RRC connection of the UE being set up. A state in which the RRC connection is set up is called an "RRC-Connected state," and a state in which RRC connection is not set up is called an "RRC-Idle state."

The SGSN manages a PMM (Packet Mobility Management) state of a UE. A UE for which an MM context is not created in an SGSN is identified as a UE in a PMM-Detached state. A UE for which an MM context is created in an SGSN through a GPRS Attach procedure is divided into a UE in a PMM-Connected state and a UE in a PMM-Idle state. A state in which a UE has Iu-PS signaling connection and is in an RRC-Connected state is called a "PMM-Connected state." A state in which a UE does not have Iu-PS signaling connection or is in an RRC-Idle state is called a "PMM-Idle state." The MSC manages a CMM (Circuit Mobile Management) state of a UE. A state in which a UE has Iu-CS signaling connection and is in an RRC-Connected state is called a "CMM-Connected state, and a state in which a UE does not have Iu-CS signaling connection or is in an RRC-Idle state is called a "CMM-Idle state."

For UEs requesting an MBMS service, an MBMS service context and an MBMS UE context are used in network nodes for the MBMS service. Because the MBMS service simultaneously transmits the same information to a plurality of UEs, an MBMS service context is uniquely created for each MBMS service or each session in an MBMS service, rather than being individually created for each UE. The MBMS UE context stores information on an MBMS service that each UE joined.

In order to perform an MBMS service, an MBMS service context must first be created in UEs and a BM-SC, which are front-end points of the MBMS service. Also, an MBMS service context is created in an RNC, SGSN, and GGSN, which are network nodes used for transmitting MBMS data.

In a PS network represented by an RNC and an SGSN, because information related to a UE in a PMM-Idle mode is not included in an MBMS service context of an RNC, the UE may fail to receive an MBMS paging from the PS network. This phenomenon can occur when although RRC connection for a circuit switched (CS) service is set up between a UE and an RNC, the PS network does not recognize this fact.

FIG. 2 is a diagram illustrating an operation occurring when a UE is in a PMM-Idle mode while managing RRC connection set up to an RNC (RRC-Connected state) in a conventional MBMS system. In FIG. 2, reference numeral 202 represents a UE receiving an MBMS service, reference numeral 204 represents a serving RNC (SRNC) for an MBMS service, which is associated with the UE 202, and reference numeral 206 represents an SGSN of a CN for the MBMS service.

The UE 202 is in a PMM-Idle mode where it joined an MBMS service but does not have a PS signaling. Referring to FIG. 2, in step 210, the UE 202 sets up an RRC connection for receiving a CS service, and transitions to a Cell-FACH (Forward Access Channel) or Cell-DCH (Dedicated Channel) state of an RRC-Connected mode. In step 220, the SGSN 206 detects start of an MBMS service through an MBMS Session Start message received via a BM-SC. The MBMS Session Start message includes MBMS service ID, multicast area information, and QoS (Quality of Service) information.

In step 230, the SGSN 206 searches for an MBMS service context corresponding to the MBMS service identified by an MBMS service ID included in the MBMS Session Start message, and transfers the MBMS. Session Start message to RNCs belonging to an RNC list included in the MBMS service context, and all RNCs belonging to RA (Routing Area) to which UEs in a PMM-Idle state belong, in order to inform the RNCs that transmission of MBMS data is started.

In step 240, the RNC 204 analyzes an MBMS service ID in the MBMS Session Start message received from the SGSN 206 in order to page UEs that are requesting the MBMS service. Here, because the MBMS Session Start message transmitted in step 230 does not include a UE ID, the SRNC 204 detects IDs of UEs joined the MBMS service using the MBMS service ID included in the MBMS Session Start message.

In an MBMS paging procedure, the SRNC 204 calculates the same PO (Paging Occasion) and PI (Paging Instance) values using the MBMS service ID (for example, TMGI) and a DRX parameter. The SRNC 204 turns on or off a pilot indication channel (PICH) for a time period indicated by the PI and the PO to indicate whether a related paging channel (PCH) for UEs is received, and pages the UEs through a related PCH that starts a predetermined time after the PICH. Here, in order to page UEs in a Cell-DCH state, a Paging Type 2 message transmitted over a dedicated control channel (DCCH) is used.

However, if the SRNC 204 deletes information on a relation between a certain UE 202 and the MBMS service as illustrated in step 240, while the UE 202 switches to a PMM-Idle mode, the SRNC 204 cannot transmit the Paging Type 2 message to the UE 202 as illustrated in step 250.

That is, the SRNC 204 uses a common channel (CCH) to page UEs in a PMM-Idle mode. However, because the UE 202 actually has a dedicated channel for a CS service with a CS network, it cannot receive an MBMS paging over the common channel. Undesirably, therefore, the UE 202 cannot receive MBMS data although it has requested an MBMS service.

SUMMARY OF THE INVENTION

It is, therefore, an object of the present invention to provide a method for performing MBMS paging on UEs in all states in order to provide an MBMS service in a mobile communication system.

It is another object of the present invention to provide a method for performing MBMS paging on UEs in a CS service to provide an MBMS service in a mobile communication system.

It is further another object of the present invention to provide a method for managing an MBMS service context for UEs in a PMM-Idle/RRC-Connected mode in an RNC.

It is yet another object of the present invention to provide a method for managing an MBMS service context for UEs in a PMM-Idle/RRC-Connected mode in an SGSN.

In accordance with one aspect of the present invention, there is provided a method for managing information on user equipments (UEs) in a mobile communication system including a Node B, a plurality of the UEs capable of communicating with the Node B in a cell occupied by the Node B, and a radio network controller (RNC) for controlling communication of the Node B and the UEs to provide a packet switched (PS) service and a circuit switched (CS) service to the UEs, the system providing an MBMS (Multimedia Broadcast/Multicast Service) service to the UEs. The method comprises the steps of: transmitting MBMS service-related information of a UE that is in a Packet Mobility Management-Idle (PMM-Idle) mode after joining at least one MBMS service, from the UE to the RNC; and storing the MBMS service-related information in a first service context for the MBMS service held in the RNC, together with information on the UE.

In accordance with another aspect of the present invention, there is provided a method for managing information on user equipments (UEs) in a mobile communication system including a Node B, a plurality of the UEs capable of communicating with the Node B in a cell occupied by the Node B, a radio network controller (RNC) for controlling communication of the Node B and the UEs to provide a packet switched (PS) service or a circuit switched (CS) service to the UEs, and a serving node for managing the RNC, the system providing an MBMS (Multimedia Broadcast/Multicast Service) service to the UEs. The method comprises the steps of: transmitting MBMS service-related information of a UE that is in a Packet Mobility Management-Idle (PMM-Idle) mode after joining at least one MBMS service, from the UE to the serving node; and linking the MBMS service-related information with information on the UE, and storing the MBMS service-related information linked to the information on the UE in a first service context for the MBMS service in held the serving node.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
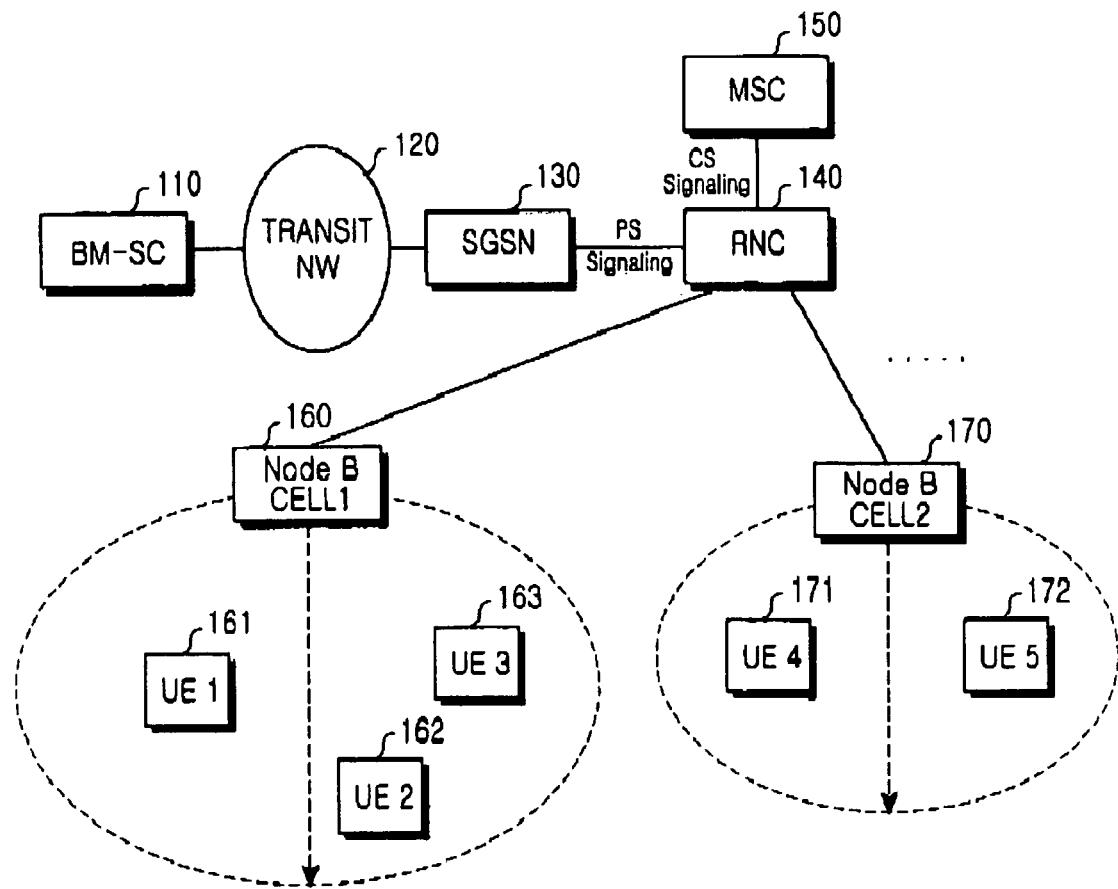
FIG. 1 is a diagram schematically illustrating a network configuration for a Multimedia Broadcast/Multicast Service (MBMS) service.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 3:
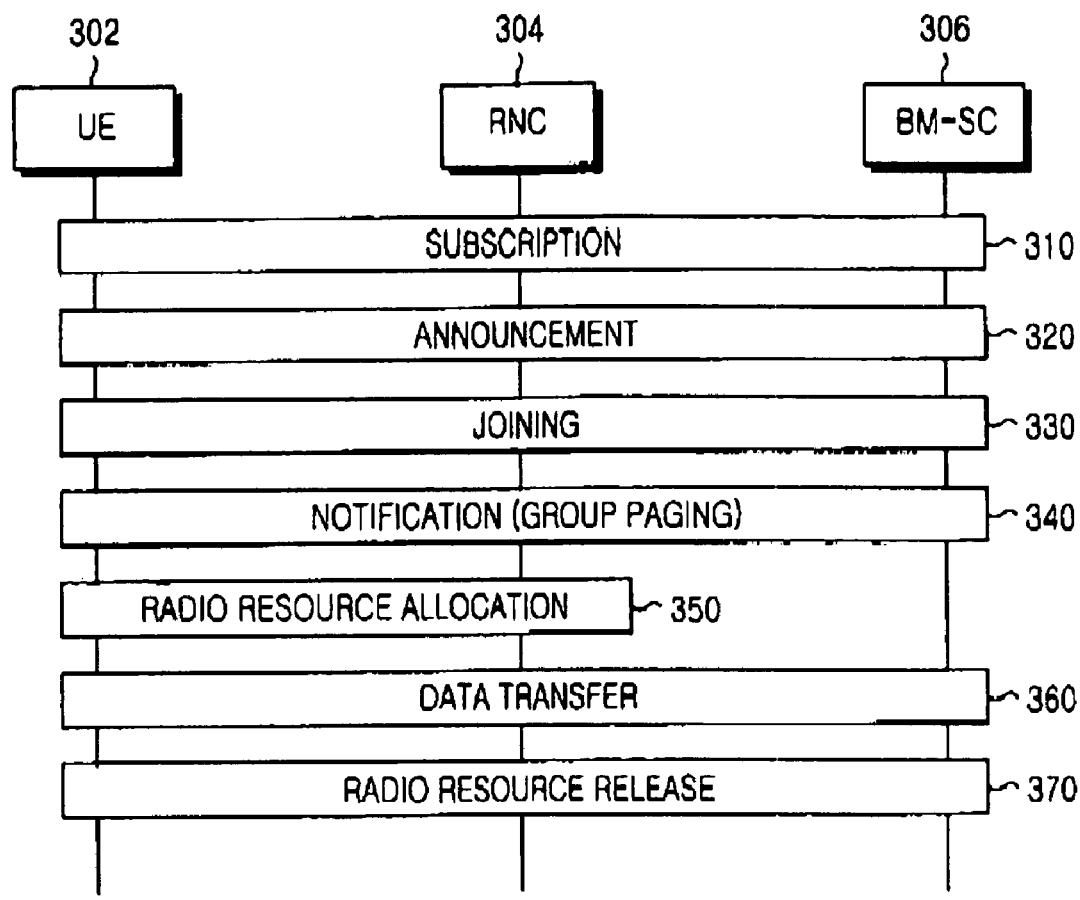
FIG. 3 is a diagram illustrating a procedure for performing an MBMS service.

FIG. 3 is a diagram illustrating an MBMS service procedure between a user equipment (UE) and a network. In FIG. 3, a BM-SC 306 communicates with a UE 302 via an RNC 304. The RNC 304 communicates with the BM-SC 306 via an SGSN (not shown). Although one RNC 304 and one UE 302 are illustrated in FIG. 3 for simplicity, the same procedure can also be applied to a plurality of UEs requesting an MBMS service and a plurality of RNCs.

Referring to FIG. 3, in a Subscription step 310, a user, or the UE 302, requesting an MBMS service is subscribed (or registered) in a service provider, or the BM-SC 306. In the Subscription step 310, the user exchanges fundamental information related to accounting or service reception with the service provider.

In an Announcement step 320, UEs detect fundamental information on an MBMS service, such as IDs (MBMS service IDs) of MBMS services available in the BM-SC 306, and their service start time and duration. For example, the MBMS service ID includes a multicast address and an access point name (APN). In the Announcement step 320, nodes interposed between the BM-SC 306 and the UE 302, i.e., the RNC 304, an SGSN and a transit network, detect the UE 302 and the nodes connected to the UE 302. For example, the SGSN analyzes a list of UEs desiring to receive the MBMS service and a list of RNCs where the UEs are located, and transmits MBMS data to only the RNCs where the UEs are located by consulting the lists.

After acquiring the fundamental MBMS service information, the UE 302 performs a Joining step 330 in order to receive its desired MBMS service data. In the Joining step 330, the UE 302 sends at least one of the MBMS service IDs obtained in the Announcement step 320 to the BM-SC 306.

A Notification step 340 is for paging the UE 302 in order to inform that the MBMS service joined by the UE 302 will be initiated soon. In the step 340, multiple UEs joining the MBMS service are paged on a group paging basis.

A Radio Resource Allocation step 350 is a step for actually allocating a radio resource between the UE 302 and the RNC 304 for providing the MBMS service, and then notifying the information to related nodes. In the step 350, the RNC 304 can select a point-to-multipoint (PtM) or a point-to-point (PtP) connection method based on information on the number of UEs belonging to each of its cells and a radio resource management function.

In a Data Transfer step 360, actual MBMS data is transferred to the UE 302 via the RNC 304. In step 360, for example, if a ciphering key for the MBMS service must be changed, the RNC 304 delivers a new ciphering key to all UEs receiving the MBMS service.

If the MBMS service is ended (or suspended), in a Radio Resource Release step 370, the allocated radio resource is released and the UE 302 is notified that the MBMS radio resource is released. Though not illustrated, while receiving the MBMS service (in step 350), the UE 302 can spontaneously request suspension of the MBMS service and then suspend reception of the MBMS service.

In order to perform an MBMS service as described above, an MBMS service context (or MBMS context) must be stored in network nodes related to the corresponding MBMS service, particularly in an SGSN and an RNC. The MBMS service context is created by the network nodes in the Joining step 330. A time when the MBMS service context is generated and a method of managing the MBMS service context are determined depending on functions of the network nodes.

Figure 4:
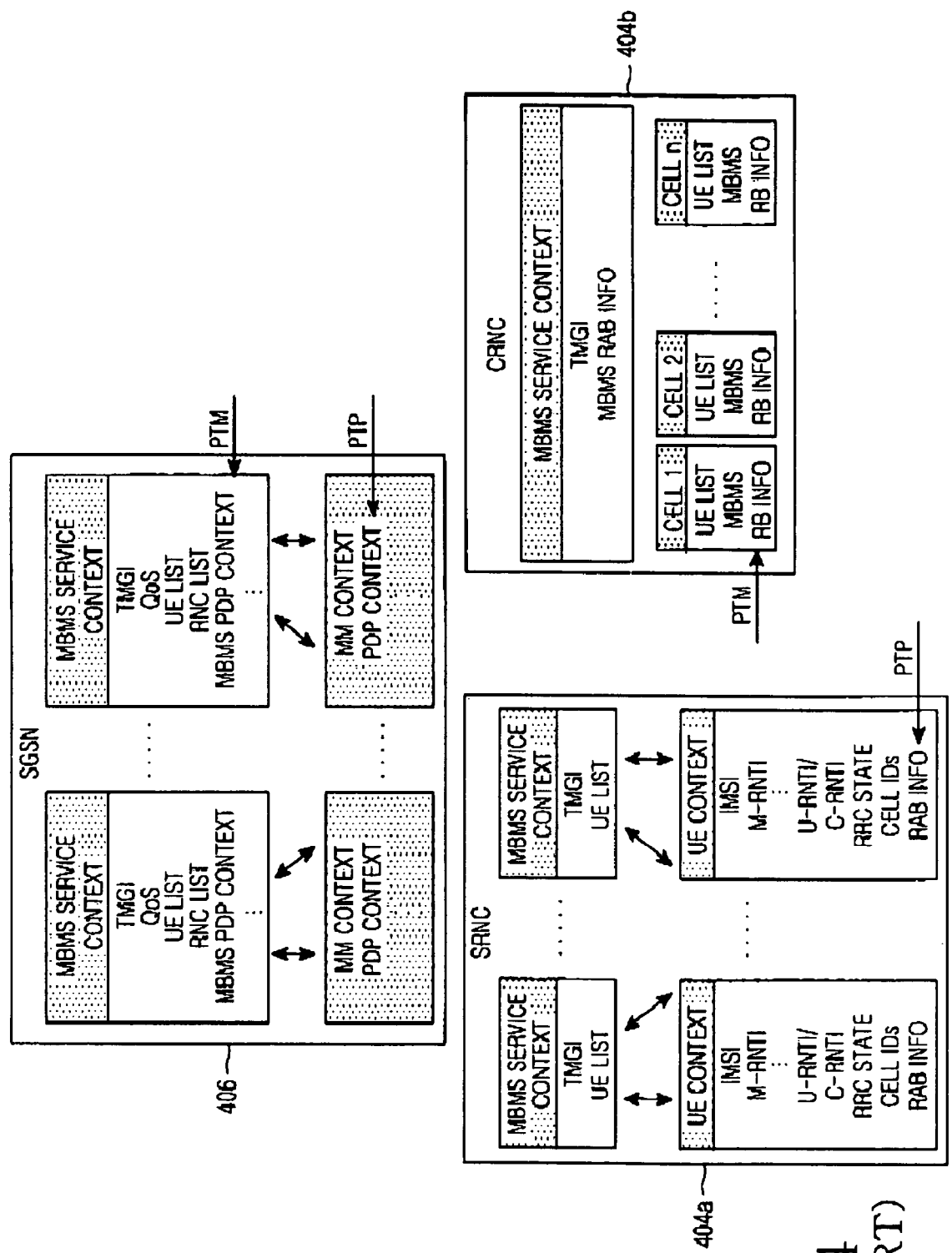
FIG. 4 is a diagram illustrating MBMS service contexts for an MBMS service.

FIG. 4 is a diagram illustrating MBMS service contexts created by an RNC and an SGSN. In FIG. 4, a serving RNC (SRNC) for managing RRC connections of UEs is separated from a control RNC (CRNC) for managing cells where the UEs are actually located.

Referring to FIG. 4, a first MBMS service context stored in an SGSN 406 includes an MBMS service ID (or Temporary MBMS Group Identity (TMGI)), a UE List (or UE ID list), an RNC List (or RNC ID list), SAC (Service Access Control) List, Multicast Area List, QoS (Quality of Service) information, and MBMS PDP (Packet Data Protocol) Context information, for a plurality of UEs.

The MBMS service ID can be an identity (Multicast address/APN or MBMS Group Identity (IMGI)) permanently allocated to the corresponding MBMS service, or an identity (Temporary MBMS Group Identity (TMGI)) temporarily allocated to identify an MBMS service by a corresponding SGSN (or GGSN). The SGSN (or GGSN) allocates the TMGI value when it first creates an MBMS service context for the MBMS service.

The UE ID list has IDs of UEs belonging to a corresponding SGSN among UEs joining a corresponding MBMS service. A UE ID in the MBMS service context is used as a pointer pointing an MM context in the SGSN 406. Because a mapping relation between an MBMS service context and an MM context is held by the UE ID, the MM context (e.g., MM state information) necessary for an MBMS service is not repeatedly stored in the MBMS service context.

The RNC ID list is a set of RNCs to which UEs included in the UE ID list belong. By using the RNC ID list, the SGSN can transmit MBMS data only to RNCs to which UEs actually requesting an MBMS service belong, rather than transmitting the MBMS data to all of its RNCs.

The SAC list and the multicast area list represent service areas where the MBMS service is available. The QoS information includes such attributes as traffic class, date rate, SDU (Service Data Unit) format information, and SDU error rate of MBMS data to be transmitted.

MBMS service contexts of RNCs 404a and 404b have a different format according to whether they are a serving RNC (SRNC) 404a for managing RRC connection of a UE or a control RNC (CRNC) 404b where the UE is physically located.

An MBMS service context of the SRNC 404a includes an MBMS service ID (or Temporary MBMS Group Identity (TMGI)) and a UE ID list (or UE List), and an MBMS service context of the CRNC 404b includes an MBMS service ID (or Temporary MBMS Group Identity (TMGI)), a UE ID list (or UE List), and MBMS barer-related information, i.e., MBMS radio access bearer (RAB) INFO.

As indicated above, the MBMS bearer-related information includes information on an RAB between the CRNC 404b and the SGSN 406, and information on a radio bearer (RB) between the CRNC 404b and UEs. The RAB information exists for each MBMS service of each RNC for a single QoS, and the RB information exists for each MBMS service of each cell for a single QoS.

Figure 5:
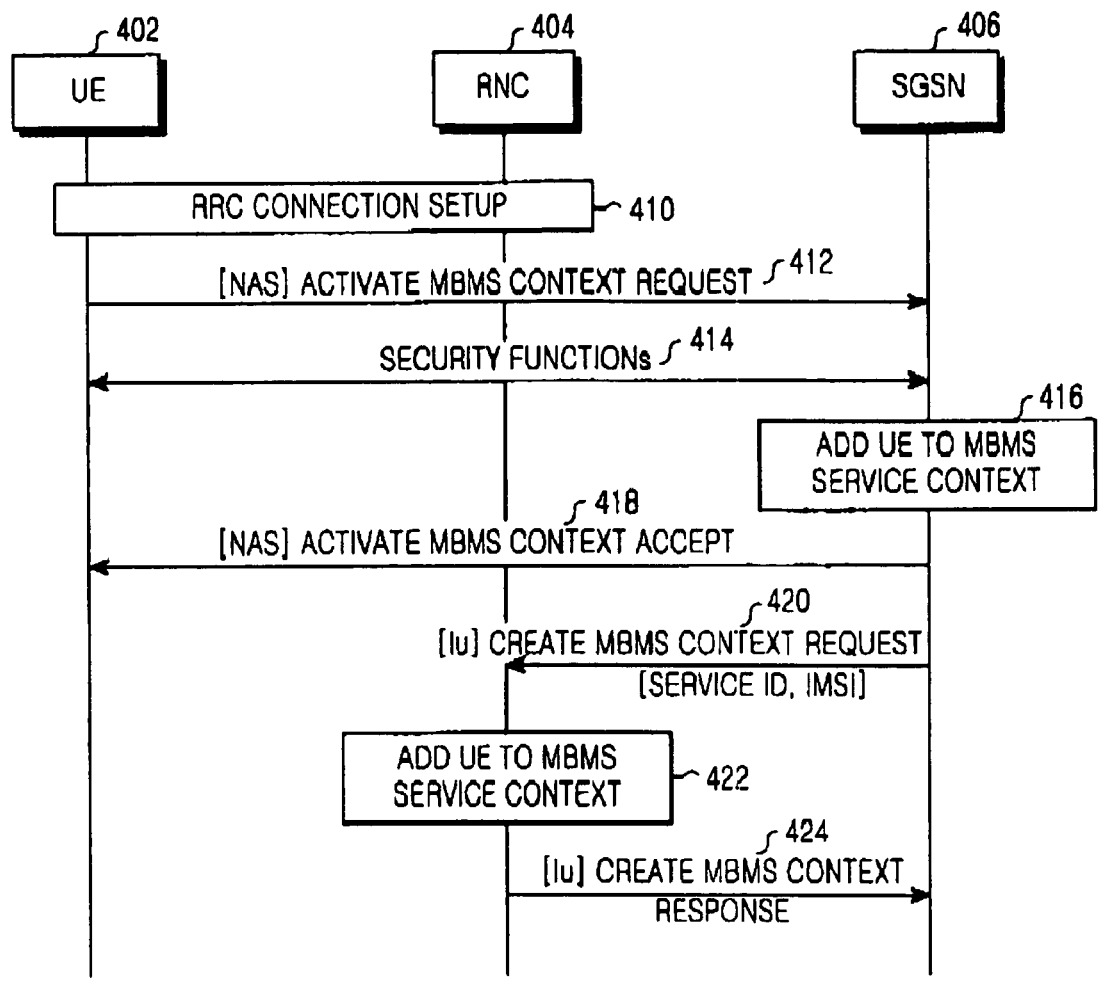
FIG. 5 is a detailed diagram illustrating a Joining procedure for an MBMS service.

The Joining step 330 of FIG. 3 will now be described in detail with reference to FIG. 5. In FIG. 5, reference numeral 402 represents a UE receiving an MBMS service, reference numeral 404 represents an RNC for an MBMS service, associated with the UE 402, and reference numeral 406 represents an SGSN of a core network (CN) for the MBMS service. As already described in FIG. 3, the UE 402 acquires IDs of MBMS services available in its cell through the MBMS Service Announcement step 320. If an RRC connection is not set up between the UE 402 and the RNC 404, the UE 402 sets up an RRC connection to the RNC 404 in step 410, in order to join a desired MBMS service.

In step 412, the UE 402 transmits an ID of a desired MBMS service among MBMS services in a corresponding cell, acquired through the MBMS Service Announcement step 320, to the SGSN 406 via the RNC 404, along with an Activate MBMS Context Request message based on a NAS (Non-Access Stratum) interface between the UE 402 and the SGSN 406. In order to transmit the Activate MBMS Context Request message, initial direct transfer is used between the UE 402 and the RNC 404, and an initial UE message is used between the RNC 404 and the SGSN 406. However, the initial direct transfer and the initial UE message depart from the scope of the present invention, so a detailed description thereof will be omitted.

Upon receiving the Activate MBMS Context Request message, the SGSN 406 authenticates the UE 402 in step 414 through a Security Function procedure for inquiring of an authentication center about whether the UE 402 is a valid user. If the authentication on the UE 402 is successful, the SGSN 406 adds in step 416 information on the UE 402 to an MBMS service context corresponding to the MBMS service. If the UE 402 is a first UE that requests the MBMS service, the SGSN 406 preferentially performs an operation of generating the MBMS service context for the MBMS service.

In step 418, the SGSN 406 transmits an Activate MBMS Context Accept message to the UE 402 to inform that a request for joining the MBMS service is successfully accepted. The Activate MBMS Context Accept message can include the MBMS service ID and a DRX parameter. The MBMS service ID transmitted along with the Activate MBMS Context Accept message is a temporary MBMS service identity, i.e., TMGI, allocated to an activated MBMS service.

Because the Activate MBMS Context Request message and the Activate MBMS Context Accept message transparently pass through the RNC 404 when they are transferred between the UE 402 and the SGSN 406, the RNC 404 cannot know whether the UE 402 has requested the MBMS service. Therefore, in step 420, the SGSN 406 instructs the RNC 404 to update the MBMS service context through a Create MBMS Context Request message. The Create MBMS Context Request message is also called an MBMS UE Linking Request message.

The Create MBMS Context Request message includes a UE ID and an MBMS service ID. The MBMS service ID in the Create MBMS Context Request message is an identity permanently allocated to a service, such as an MBMS Multicast address, or a temporary identity (TMGI) allocated to the MBMS service. Herein, it should be understood that the MBMS service ID corresponds to both of the two identities.

In step 422, the RNC 404 adds information on the UE 402 to a corresponding MBMS service context, and in step 424, the RNC 404 sends a Create MBMS Context Response message to the SGSN 406. If the UE 402 is a first UE that requested the MBMS service, the RNC 404 preferentially performs an operation of creating the MBMS service context for the MBMS service.

Figure 6:
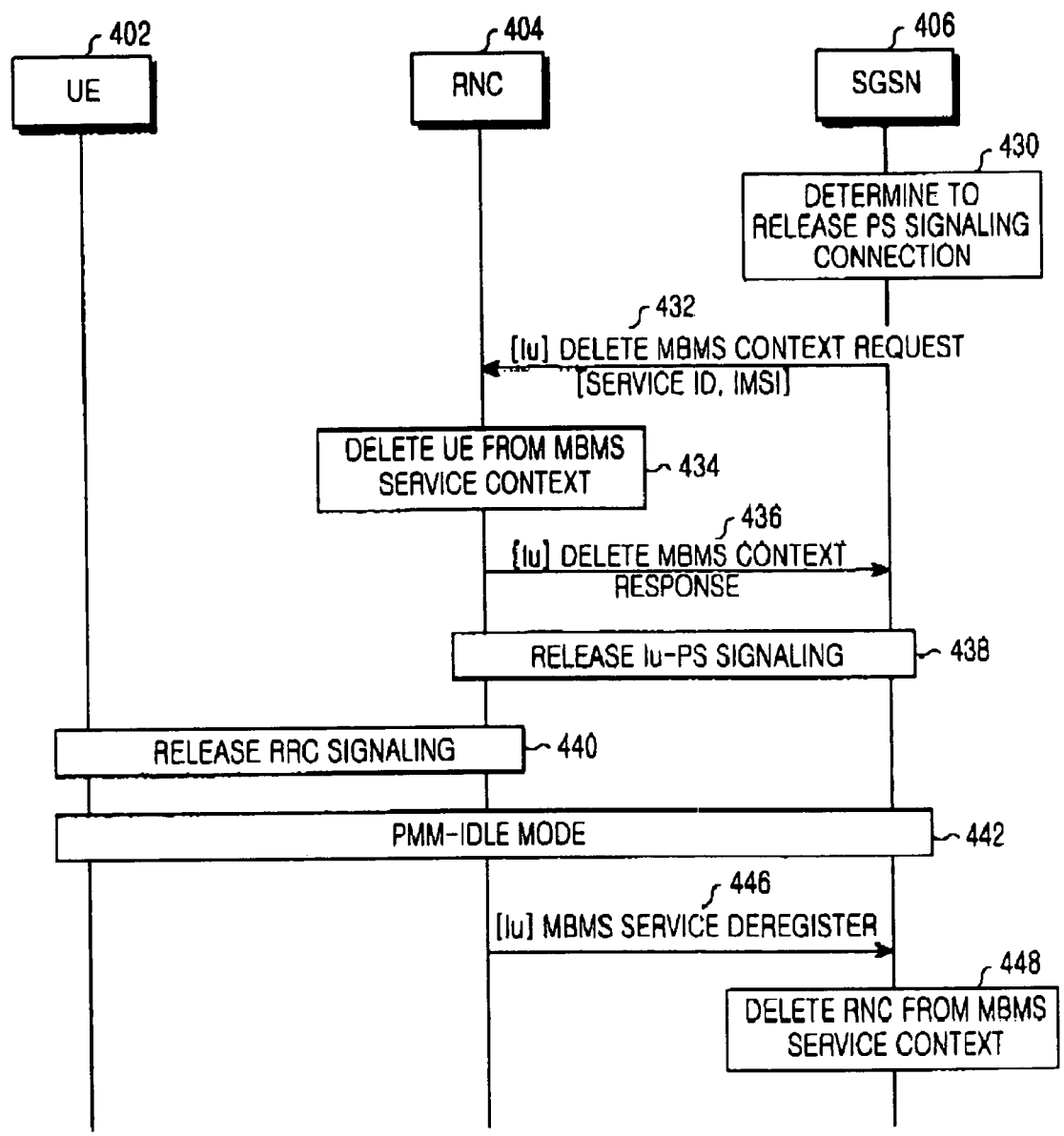
FIG. 6 is a diagram illustrating a procedure for releasing signaling with a PS network by a UE that joined an MBMS service.

FIG. 6 is a diagram illustrating PS signaling being released because MBMS data transmission is not initiated yet even though a predetermined time has passed after a UE joined an MBMS service through the procedure illustrated in FIG. 5. Referring to FIG. 6, in step 430, the SGSN 406 determines to release PS signaling connection upon detecting no message exchange with the UE 402 for a predetermined time. In step 432, through a Delete MBMS Context Request message, the SGSN 406 requests the RNC 404 to delete the UE 402 from a UE ID list in the MBMS service context. The Delete MBMS Context Request message is also called an MBMS UE Delinking Request message. In step 434, the RNC 404 deletes information on the UE 402 from the MBMS service context, and in step 436, the RNC 404 responds to the SGSN 406 through a Delete MBMS Context Response message.

In step 438, the SGSN 406 releases Iu-PS signaling through an Iu release procedure. Therefore, the RNC 404 and the SGSN 406 determine that the UE 402 is in a PMM-Idle mode in which there is no PS signaling. If the UE 402 does not use RRC connection even for a CS service, RRC connection between the UE 402 and the RNC 404 can also be released in step 440. In step 442, the UE 402 transitions to a PMM-Idle mode by simply releasing the Iu-PS signaling regardless of whether RRC connection is released or not.

If the UE 402 is a last UE that joined the MBMS service, the RNC 404 deletes the MBMS service context after transmitting the Delete MBMS Context Response message, and transmits in step 446 an MBMS Service Deregister message to the SGSN 406. In step 448, the SGSN 406 deletes the RNC 404 from an RNC list in the MBMS service context. The MBMS service contexts in the SGSN 406 and the RNC 404 can be created, updated, and released through the procedures illustrated in FIGS. 5 and 6.

Figure 2:
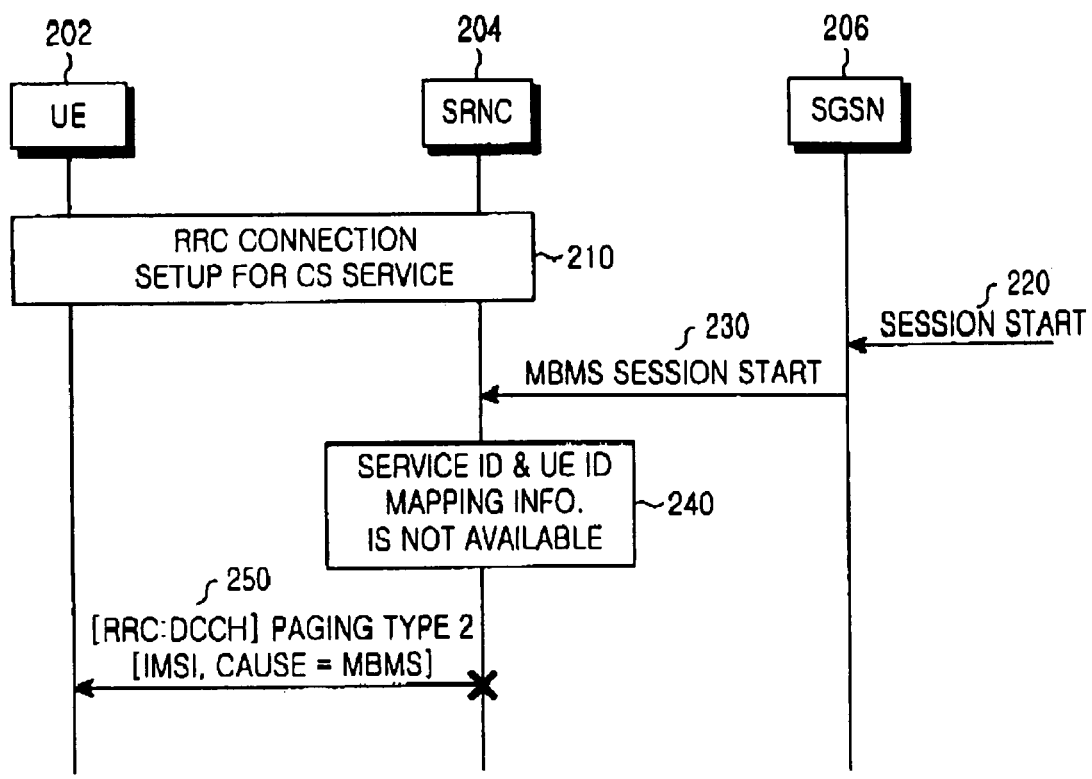
FIG. 2 is a diagram illustrating a PMM-Idle UE having RRC connection in a conventional MBMS system.

However, when information on only a UE in a PMM-Connected state that joined the MBMS service is stored in the MBMS service context in an RNC, as described in connection with FIGS. 5 and 6, if a UE requests RRC connection setup for a CS service in step 210 of FIG. 2 after transitioning to the PMM-Idle mode in step 442, information on the UE 402 is not stored in the MBMS service context of the RNC 404. As a result, the RNC 404 informs the UE 402 of initiation of the MBMS service through a common channel, and the UE 402 in an RRC-Connected state does not monitor the common channel. Therefore, the UE 402 cannot receive a Notification indicating initiation of the MBMS service and thus cannot receive the MBMS service.

In order to solve this problem, in a first embodiment of the present invention, for a PMM-Idle/RRC-Connected UE, UE information is linked with MBMS service information and managed in an MBMS context so that an RNC can detect that the UE is a terminal that has successfully joined the MBMS service. It is also possible to manage a separate context by linking the UE information with the MBMS service information. In addition, an SGSN can prevent an unsynchronized phenomenon of MBMS service contexts in the SGSN and the RNC by managing UEs in a CMM-Connected mode in the MBMS service contexts.

In a second embodiment of the present invention, if a PMM-Idle/RRC-Connected UE transitions to a PMM-Connected mode after setting up RRC connection, an SGSN and an RNC can manage a UE in a PMM-Connected mode using an MBMS service context. Herein below, information transmitted from the UE to link the UE information with the MBMS service information will be referred to as MBMS service-related information.

The first embodiment and the second embodiment will now be separately described in detail.

1. Management of a Service Context in an RNC

In a first embodiment of the present invention, in order to enable an RNC to manage information on a UE that joined an MBMS service but is in a PMM-Idle mode, MBMS service-related information indicating that the UE is a terminal that successfully joined the MBMS service is transmitted to the RNC along with a predetermined message. Then, the RNC updates information on the terminal in a corresponding MBMS service context requested by the terminal among MBMS service contexts managed by the RNC.

By transmitting the MBMS service-related information, it is possible to enable an RNC to link a list of UEs that have set up RRC connection for a CS service with MBMS service information so as to manage the UE list and the MBMS service information together. The RNC can link only IDs of the UEs with the MBMS service information before storing them, or link state information indicating that the UEs have set up an RRC connection for a CS service with the MBMS service information before storing them. Herein, both the IDs of UEs and the state information of UEs will be referred to as UE information. The MBMS service-related information corresponds to an MBMS service ID indicating an MBMS service that the terminal joined, or an MBMS service activation indicator.

In transmitting the MBMS service ID, authenticating a terminal as a valid terminal for an MBMS service corresponding to the MBMS service ID is required. When the terminal transmits an MBMS service activation indicator, the terminal must receive, from an SGSN, information on at least one MBMS service requested by the terminal. The MBMS service-related information is transmitted using an RRC Connection Setup message or a dedicated RRC message.

Figure 7:
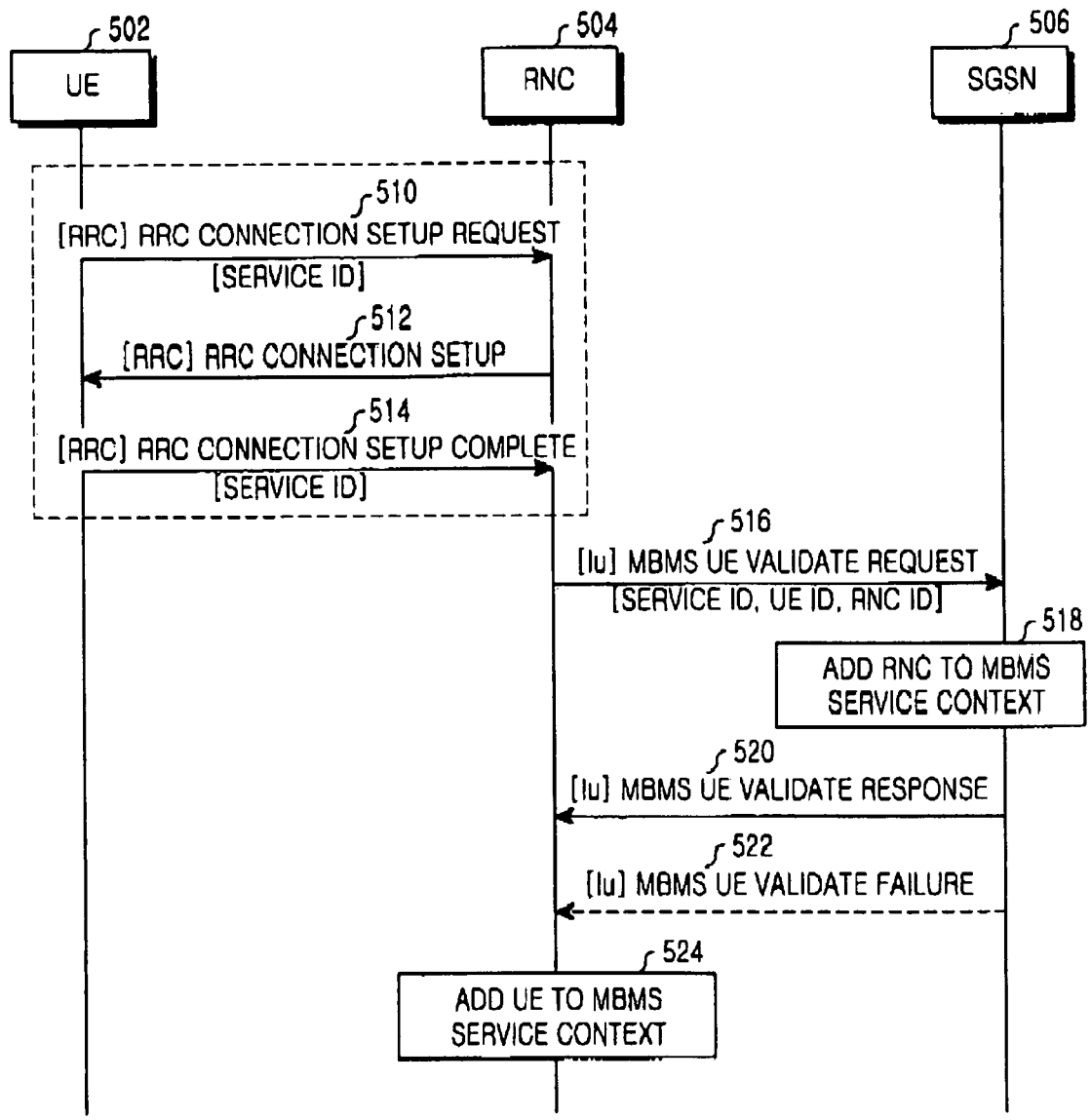
FIGS. 7 to 9 are diagrams illustrating procedures for transmitting MBMS service-related information from a UE to an RNC according to a first embodiment of the present invention.
Figure 8:
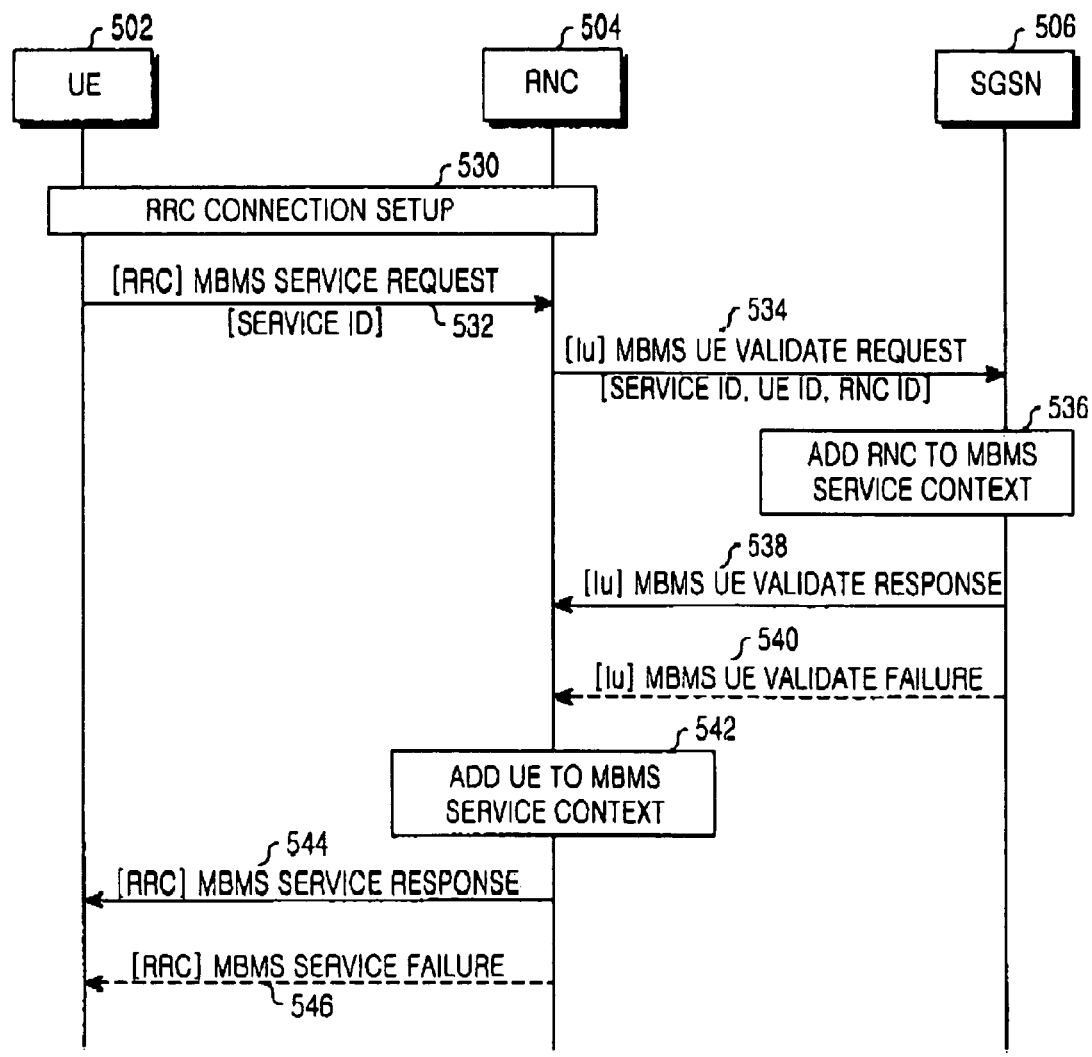
Figure 9:
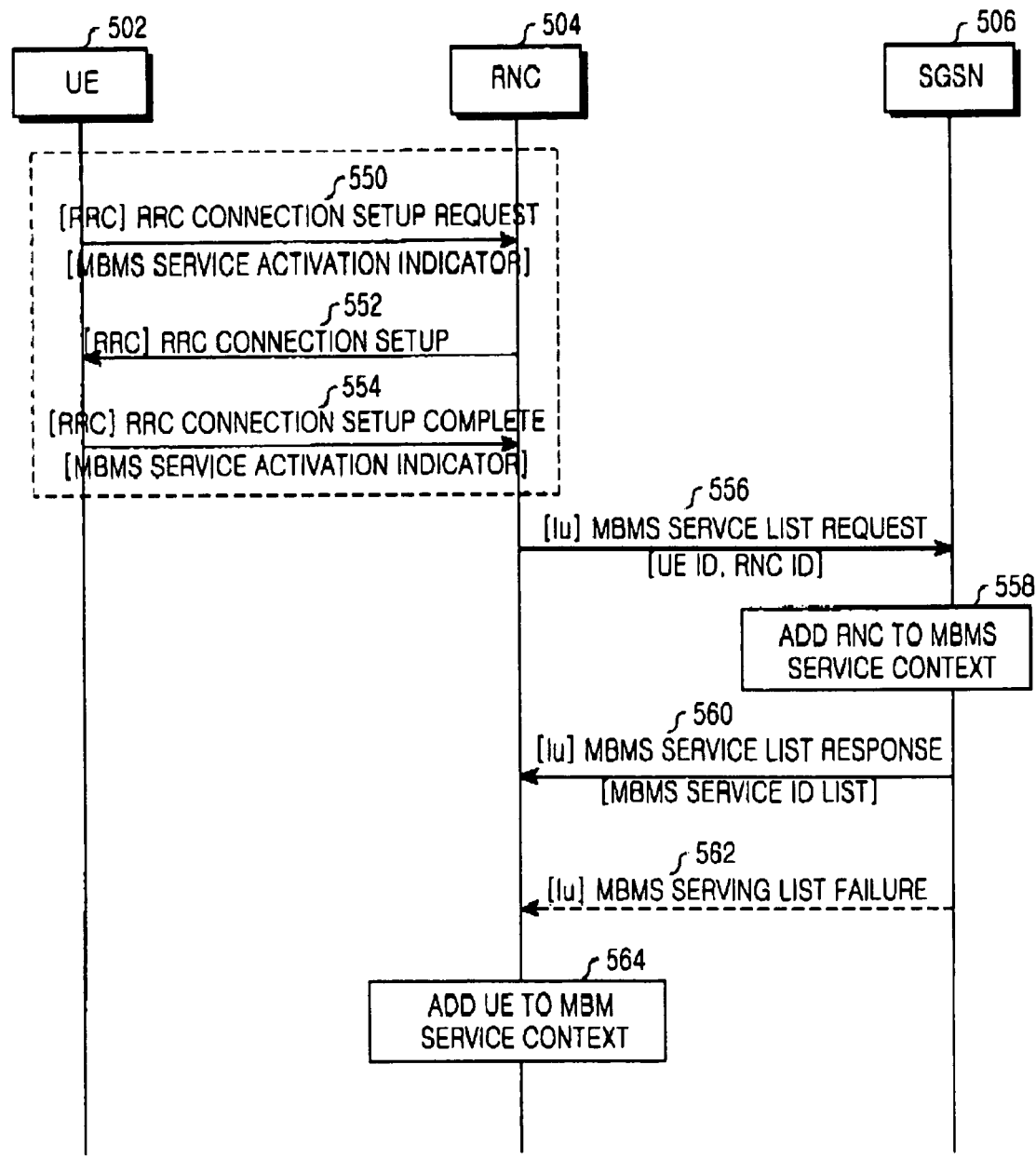

FIGS. 7 to 9 illustrate procedures for adding information on a UE to an MBMS service context of an RNC associated with the UE that joined an MBMS service but is in a PMM-Idle mode. In FIGS. 7 to 9, reference numeral 502 represents a UE receiving an MBMS service, reference numeral 504 represents an RNC serving the UE 502, and reference numeral 506 represents an SGSN of a CN for the MBMS service. In addition, an MBMS service context of the SGSN 506 will be referred to as a "first MBMS service context," and an MBMS service context of the RNC 504 will be referred to as a "second MBMS service context."

FIG. 7 is a diagram illustrating a method of inserting an MBMS service ID into an RRC Connection Setup Request message when transmitting a message for an RRC connection setup procedure between a UE and an RNC, to manage an MBMS service context of the RNC. Referring to FIG. 7, steps 510, 512, and 514 are performed to set up an RRC connection between the UE 502 and the RNC 504. More specifically, if the UE 502 transmits in step 510 an RRC connection Setup Request message for a PS service or a CS service to the RNC 504, the RNC 504 responds thereto in step 512, using an RRC Connection Setup message. In step 514, the UE 502 transmits an RRC Connection Setup Complete message, completing setup of RRC connection between the UE 502 and the RNC 504.

In the RRC connection setup process for a PS service or a CS service in the steps 510 to 514, the UE 502 inserts at least one MBMS service ID indicating a desired MBMS service in the RRC Connection Setup Request message or the RRC Connection Setup Complete message, before transmission. Then the RNC 504 changes a second MBMS service context of an MBMS service corresponding to the MBMS service ID in step 524. That is, the RNC 504 adds UE information to the second MBMS service context, indicating that the UE 502 has an RRC connection.

Through the above-described procedure, the RNC 504 can store information on UEs that have set up an RRC connection for a PS service or a CS service among UEs that requested the MBMS service, in a corresponding MBMS service context. Here, the MBMS service context corresponds to separate information for PMM-Idle/RRC-Connected UEs or an existing MBMS service context for each MBMS service.

Updating an MBMS service context by the RNC 504 can be performed immediately after the RRC connection setup procedure of 510 to 514, or performed after validity of the UE 502 is determined as illustrated in FIG. 7.

In step 516, the RNC 504 uses an MBMS UE Validate Request message to determine whether the UE 502 is valid for the requested MBMS service. The MBMS UE Validate Request message includes a UE ID of the UE 502, an MBMS service ID acquired in the RRC connection setup procedure of steps 510 to 514, and an RNC ID of the RNC 504. Further, the MBMS UE Validate Request message is transferred from the RNC 504 to the SGSN 506.

In transmitting the MBMS UE Validate Request message, if the UE 502 is in a PMM-Idle state, a dedicated signaling bearer allocated for the UE 502 does not exist between the RNC 504 and the SGSN 506. Therefore, the MBMS UE Validate Request message can be transmitted using a common signaling bearer created for a corresponding MBMS service, or transmitted using a connectionless signaling transmission method.

When the MBMS UE Validate Request message is transmitted using a common signaling bearer for an MOMS service, the SGSN 506 can distinguish the MBMS service and the RNC 504 by checking a signaling bearer over which the MBMS UE Validate Request message is transmitted. Therefore, the MBMS service ID and the RNC ID are selectively excluded from the message. However, when the MBMS UE Validate Request message is transmitted using a connectionless signaling transmission method, the MBMS service ID and the RNC ID must be included in the message.

Upon receiving the MBMS UE Validate Request message, the SGSN 506 adds information on the RNC 504 to which the UE 502 that has RRC connection and requested an MBMS service belongs, to a first MBMS service context in step 518, if the first MBMS service context corresponding to an MBMS service ID included in the message of the step 516 exists and a UE ID included in the message of the step 516 exists in the first MBMS service context. The SGSN 506 can also store state information in the first MBMS service context so as to indicate that a corresponding UE is in a CMM-Connected state. In this case, if the first MBMS service context already has information on the RNC 504, the SGSN 506 is not required to add the information on the RNC 504 again.

If the UE 502 is valid for the MBMS service, an MBMS UE Validate Response message is transmitted from the SGSN 506 to the RNC 504 in step 520. The MBMS UE Validate Response message includes information on an area where the MBMS service is available.

For example, the information on an area where the MBMS service is available represents a service area code (SAC) or multicast area information. If it is determined, based on the service area information, that the UE 502 is located in a cell not belonging to an area where the MBMS service is available, the RNC 504 can request the UE 502 to move to another cell.

When updating an MBMS service context by the RNC 524 is performed after a UE authentication procedure in steps 516 to 520, the RNC 504 adds information on the UE 502 to its second MBMS service context, after receiving the MBMS UE Validate Response message in step 521. If the second MBMS service context corresponding to the MBMS service ID does not exist in the RNC 504, the RNC 504 first creates the second MBMS service context.

If the SGSN 506 fails to determine whether the UE 502 is valid in receiving the MBMS service, although the RNC 504 requested in step 516 the SGSN 506 to determine whether the UE 502 is valid for the MBMS service, the SGSN 506 transmits an MBMS UE Validate Failure message to the RNC 504 in step 522 to inform that the UE 502 has not joined the MBMS service via the SGSN 506. The MBMS UE Validate Failure message can be defined as an MBMS UE Validate Response message into which a particular parameter value 'Cause Value' is inserted.

FIG. 8 is a diagram illustrating a method of transmitting an MBMS service ID from the UE 502 to the RNC 504 after the RRC connection setup procedure. In the procedure illustrated in FIG. 8, unlike in the procedure illustrated in FIG. 7, the UE 502 transmits an MBMS Service Request message to the RNC 504 to inform that it has requested the MBMS service.

Referring to FIG. 8, the UE 502 sets up RRC connection to the RNC 504 through an RRC connection setup procedure 530. The RRC connection setup procedure 530 exchanges RRC Connection Setup Request, RRC Connection Setup, and RRC Connection Setup Complete messages between the UE 502 and the RNC 504. In the RRC connection setup procedure 530, MBMS service-related information is not transferred.

In step 532, the UE 502 delivers an MBMS service ID to the RNC 504 through an MBMS Service Request message. The MBMS Service Request message includes at least one MBMS service ID indicating an MBMS service the UE 502 desires to receive.

An operation performed after the RNC 504 receives the MBMS service ID through the MBMS Service Request message is similar to the corresponding operation illustrated in FIG. 7. That is, in step 534, the RNC 504 transmits an MBMS UE Validate Request message to the SGSN 506 in order to determine whether the UE 502 is valid for the MBMS service. The MBMS UE Validate Request message includes the MBMS service ID, a UE ID and an RNC ID.

If it is determined that the UE 502 has joined the MBMS service, the SGSN 506 adds information on the RNC 504 to its MBMS service context in step 536, and transmits an MBMS UE Validate Response message to the RNC 504 in response to the MBMS UE Validate Request message in step 538. In the step 536, the SGSN 506 can also store state information in the first MBMS service context created by the SGSN 506 so as to indicate that the UE 502 is in a CMM-Connected state.

The RNC 504 adds information on the UE 502 to its MBMS service context in response to the MBMS UE Validate Response message in step 542. In an alternate embodiment, the RNC 504 adds information on the UE 502 to its MBMS service context immediately after the MBMS Service Request message is received.

In step 544, the RNC 504 transmits an MBMS Service Response message to the UE 502 to inform that an MBMS service context is created by the RNC 504. If a cell to which the UE 502 currently belongs does not support an MBMS service, the RNC 504 includes a cell ID indicating a cell where the MBMS service is available, in the MBMS Service Response message in order to instruct the UE 502 to more to another cell in order to receive the MBMS service.

If the SGSN 506 fails to authenticate the UE 502 in step 534, although the RNC 504 inquired of the SGSN 506 about whether the UE 502 is valid for the MBMS service, the SGSN 506 transmits an MBMS UE Validate Failure message 540 to the RNC 504 to inform that the UE 502 has not joined the MBMS service via the SGSN 506. The RNC 504 then does not add information on the UE 502 in the second MBMS service context, and informs the UE 502 of unavailability of the MBMS service through an MBMS Service Failure message in step 546.

FIG. 9 is a diagram illustrating a method of adding an MBMS service activation indicator to an RRC Connection Setup Request message before transmission. The procedure illustrated in FIG. 9 is identical to the procedure illustrated in FIG. 7 in that an RRC Connection Setup Request message is used, but different from the procedure illustrated in FIG. 7 in that an MBMS service activation indicator is transmitted instead of an MBMS service ID.

The MBMS service activation indicator can be added to an RRC message (RRC Connection Setup Request message or RRC Connection Setup Complete message) as a new information element (IE), or added to the RRC message as a Cause Value (for example, Cause="MBMS Service Activation").

In this case, if the UE 502 requested a plurality of MBMS services, the UE 502 can update information on all MBMS services by transmitting an MBMS service activation indicator only once rather than transmitting separate messages for all the MBMS services.

Referring to FIG. 9, through steps 550, 552, and 554, the UE 502 sets up an RRC connection for a PS service or a CS service with the RNC 504. Here, the UE 502 inserts an MBMS service activation indicator indicating availability of a desired MBMS service into an RRC Connection Setup Request message or an RRC Connection Setup Complete message transmitted to the RNC 504, to inform that the UE 502 has joined the MBMS service. The MBMS service activation indicator can be inserted into the RRC message, i.e., the RRC Connection Setup Request message or the RRC Connection Setup Complete message, as an IE or a Cause Value.

More specifically, each of the RRC messages includes a UE ID capable of identifying the UE 502 and a Cause Value indicating the cause that the RRC connection is necessary. The Cause Value constitutes one IE in the RRC message, and the reason that the message is necessary can be determined based on a previously set value of the Cause Value. Therefore, it is possible to assign a value indicating the MBMS service activation to the Cause Value (for example, Cause="MBMS Service Activation") before transmission.

Preferably, when the UE 502 has joined one or more MBMS services, the MBMS service activation indicator can be used together with the above-stated MBMS service ID to inform the RNC 504 and the SGSN 506 that the UE 502 has joined the MBMS service.

If an RRC connection is successfully set up between the UE 502 and the RNC 504 through steps 550 to 554, in step 556, the RNC 504 transmits an MBMS Service List Request message to the SGSN 506 in order to determine whether the UE 502 has joined a certain MBMS service. The MBMS Service List Request message includes a UE ID and an RNC ID.

If the UE 502 is in a PMM-Idle state, a dedicated signaling bearer allocated for the UE 502 does not exist between the RNC 504 and the SGSN 506. Therefore, the MBMS Service List Request message is transmitted using a connectionless signaling transmission method.

In step 558, if the RNC 504 does not exist in an MBMS service context in the SGSN 506, the SGSN 506 adds to the MBMS service context information on the RNC 504. In the step 558, state information can be stored in the MBMS service context in the SGSN 506 so as to indicate that the UE 502 is in a CMM-Connected state.

In step 560, the SGSN 506 transmits information on an MBMS service currently joined by the UE 502 corresponding to a UE ID included in the MBMS Service List Request message, i.e., transmits an MBMS service ID list, to the RNC 504 along with an MBMS Service List Response message. The MBMS service ID list is extracted from a UE context stored in the SGSN 506. The UE context can be either an existing UE context or a UE context newly defined for an MBMS service.

The MBMS service ID list can further include information on an area where an MBMS service is currently available, with respect to each of the MBMS services that the UE 502 has joined. For example, the information on an area where the MBMS service is available represents a service area code (SAC) or multicast area information. If, based on the service area information, it is determined that the UE 502 is located in a cell not belonging to an area where the MBMS service is available, the RNC 504 can request the UE 502 to move to another cell.

In step 564, the RNC 504 adds information on the UE 502 to an MBMS service context corresponding to the MBMS service ID list included in the MBMS Service List Response message. If a second MBMS service context corresponding to the MBMS service ID included in the MBMS Service List Response message does not exist in the RNC 504, the RNC 504 first creates a new second MBMS service context. In addition, if the UE 502 is simultaneously joining N MBMS services, i.e., if the number of MBMS service IDs included in the MBMS service ID list is N, the RNC 504 adds information on the UE 502 to each of N second MBMS service contexts.

Although not illustrated in FIG. 9, in a modified embodiment of the present invention, a may UE transmit an MBMS Service Request message containing an MBMS service activation indicator to an RNC after RRC connection setup is completed. In response to the MBMS Service Request message, the RNC then requests an SGSN for MBMS service ID(s) of MBMS service(s) that the UE is joining, receives from the SGSN an MBMS service ID list including MBMS service ID(s) of the MBMS service(s) that the UE is joining, and adds information on the UE to its MBMS service context (s).

Through the above-described procedure, the RNC 504 detects that the UE 502 having an RRC connection is joining an MBMS service, and pages the UE 502 using a Paging Type 2 message through a dedicated channel, when a session of an MBMS service joined by the UE 502 is started.

Figure 10:
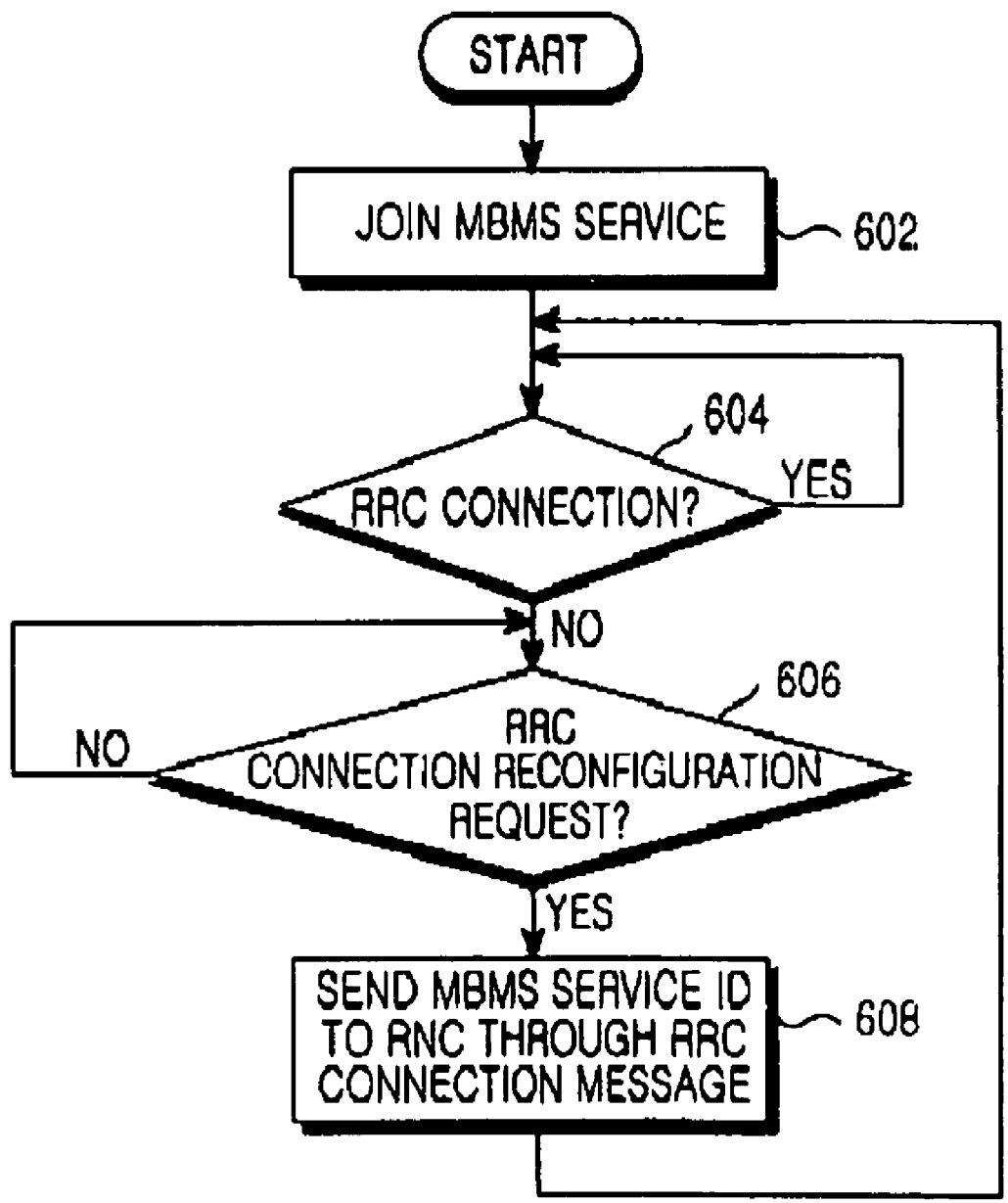
FIGS. 10 to 12 are flowcharts illustrating operation of a UE according to the first embodiment of the present invention.
Figure 11:
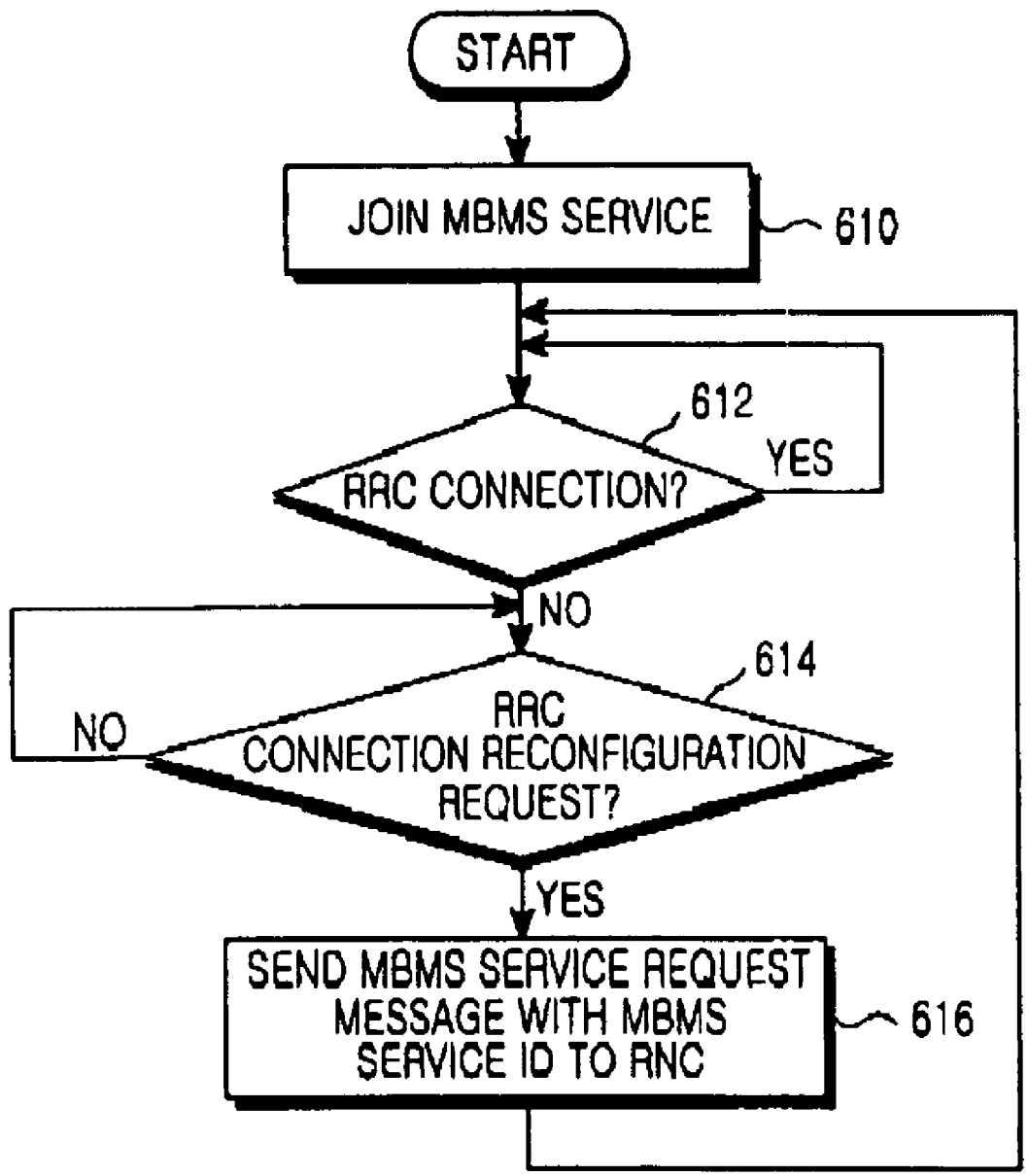
Figure 12:
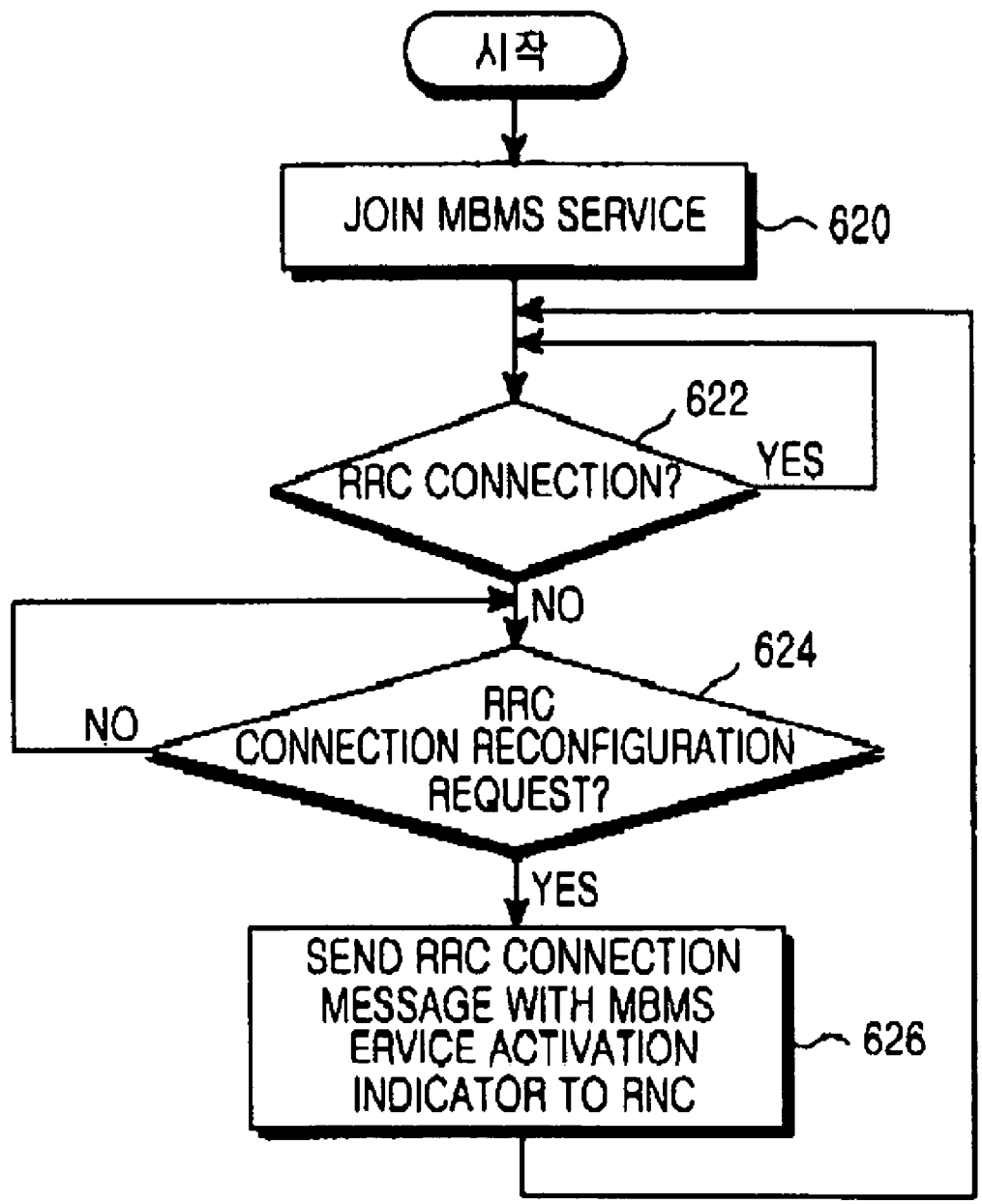

FIGS. 10 to 12 are flowcharts illustrating operations of the UE 502 according to the procedures illustrated in FIGS. 7 to 9, respectively. Referring to FIGS. 10 to 12, in steps 602, 610, and 620, the UE 502 joins an MBMS service through the procedure described in connection with FIG. 5. In steps 604, 612, and 622, the UE 502 monitors whether an RRC connection exists. If it is determined that no RRC connection exists, the UE 502 monitors in steps 606, 614, and 624 whether there is an RRC connection reconfiguration request. If it is determined that there is an RRC connection reconfiguration request, the UE 502 sends an MBMS service ID indicating the MBMS service joined by the UE 502 to the RNC 504 to which the RRC connection is to be set up, along with an RRC message, and then proceeds to steps 608, 616, and 626, respectively.

In step 608 of FIG. 10, the UE 502 inserts an MBMS service ID into an RRC Connection message, i.e., an RRC Connection Setup Request message or an RRC Connection Setup Complete message, before transmission. In step 616 of FIG. 11, the UE 502 inserts an MBMS service ID into a dedicated message such as an MBMS Service Request message, before transmission.

In step 626 of FIG. 12, the UE 502 inserts an MBMS service activation indicator into an RRC connection message, i.e., an RRC Connection Setup Request message or an RRC Connection Setup Complete message, before transmission. According to the modified embodiment of the present invention, in step 626, the UE 502 inserts an MBMS service activation indicator into a dedicated message such as an MBMS Service Request message, before transmission.

Figure 13:
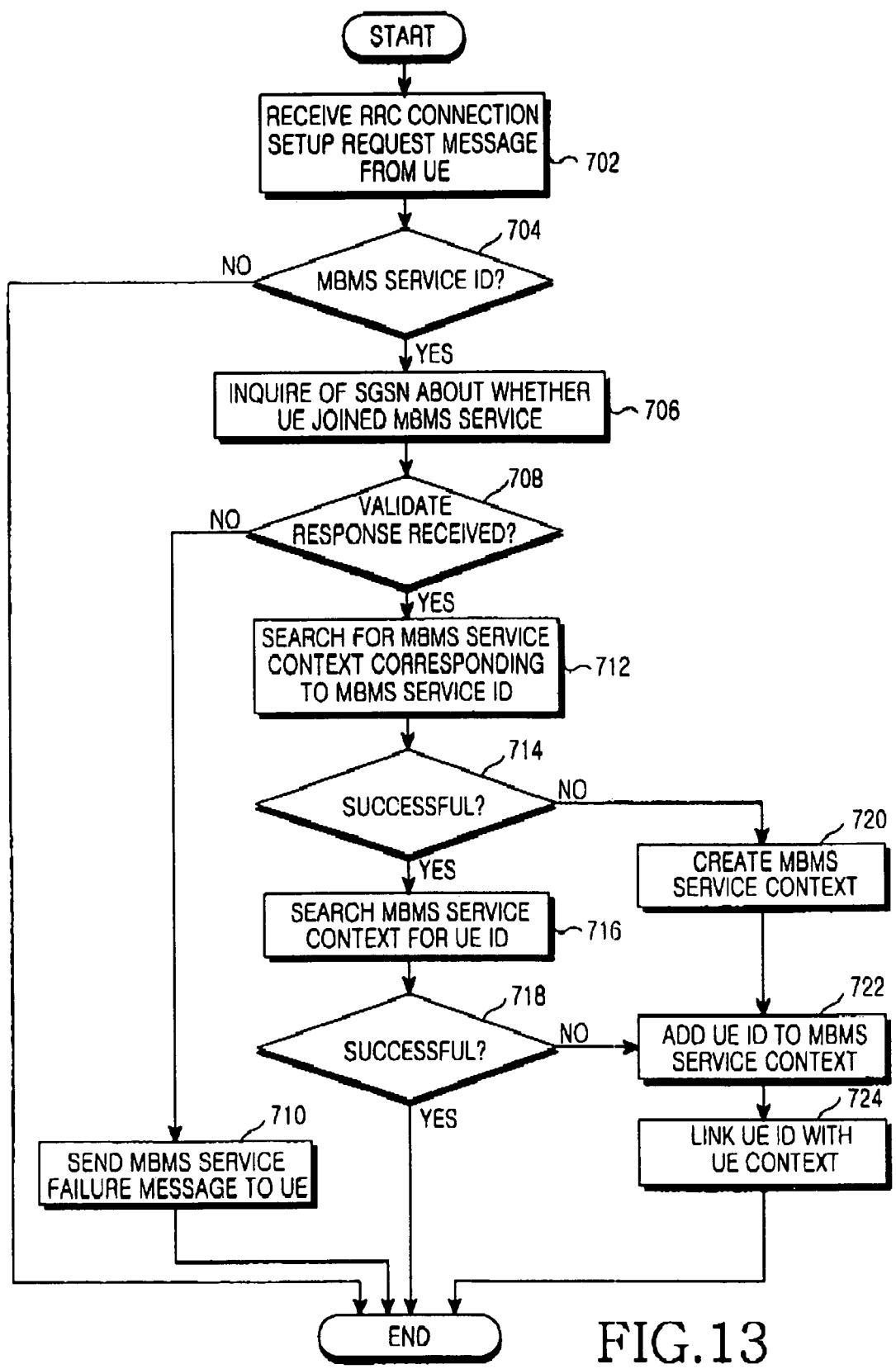
FIGS. 13 to 15 are flowcharts illustrating operation of an RNC according to the first embodiment of the present invention.
Figure 14:
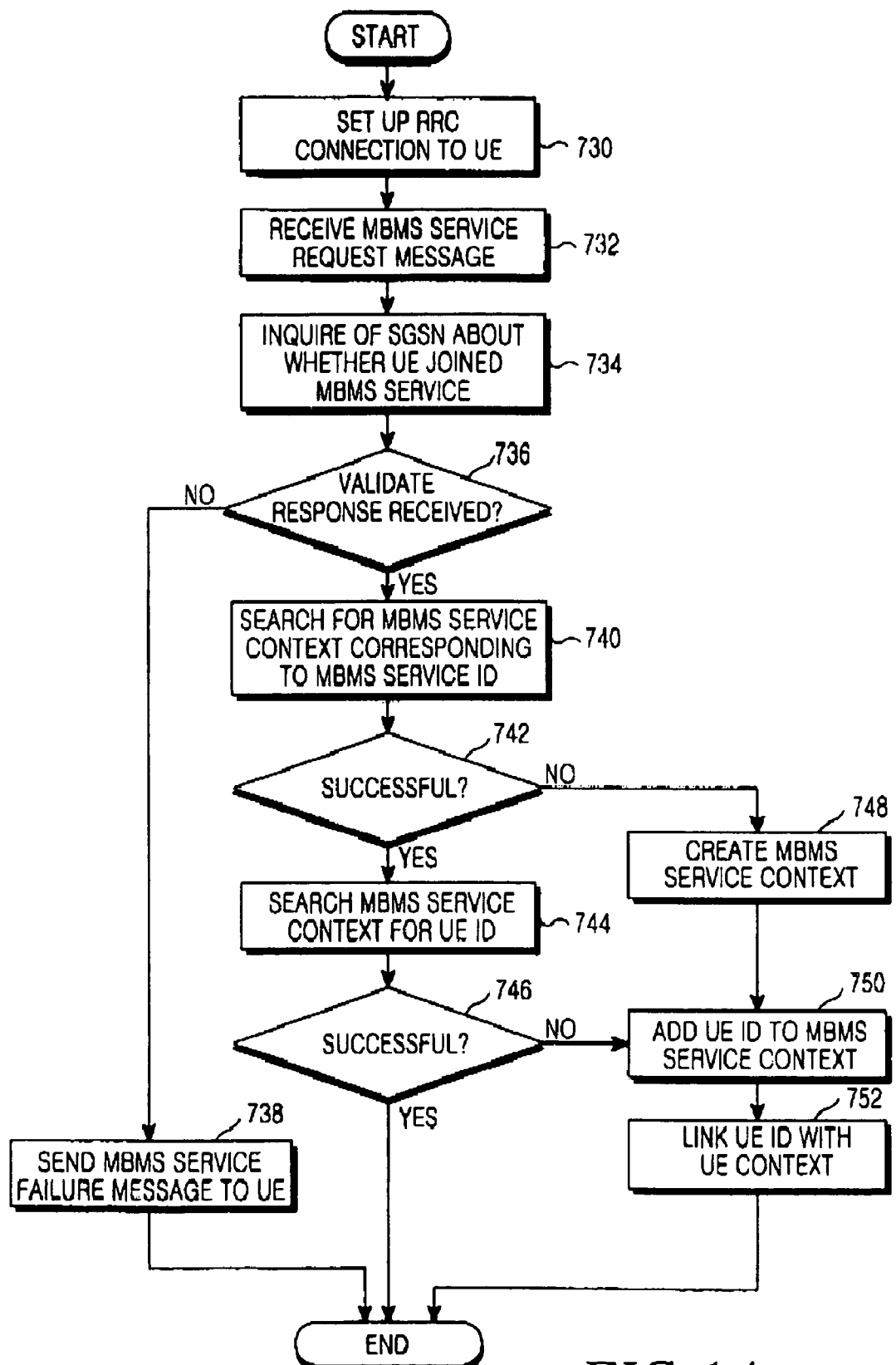
Figure 15:
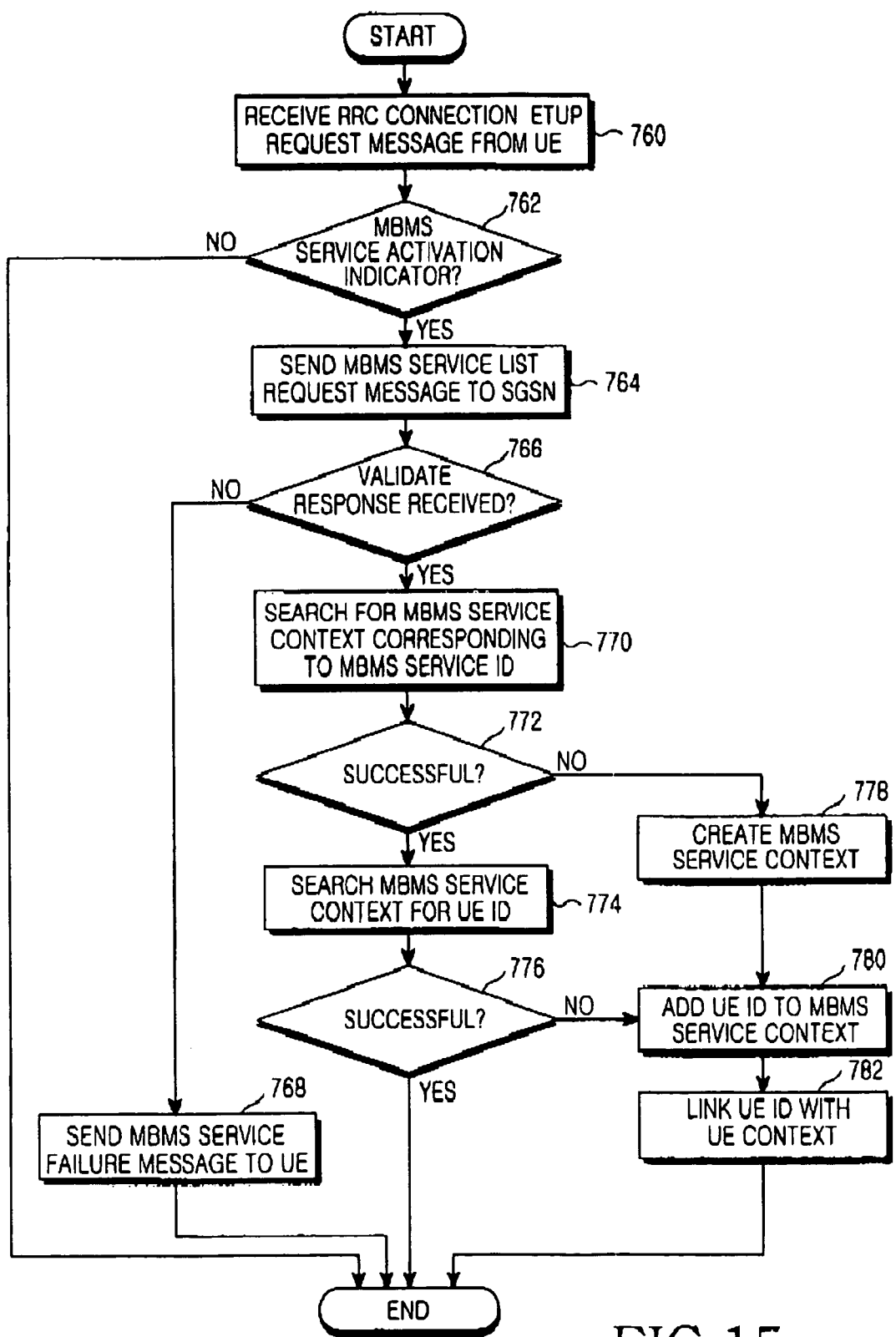

FIGS. 13 to 15 are flowcharts illustrating operations of the RNC 504 that manages a second MBMS service context, according to the procedures illustrated in FIGS. 7 to 9, respectively. Referring to FIG. 13, in step 702, the RNC 504 receives an RRC Connection Setup Request message (or an RRC Connection Setup Complete message) from the UE 502. In step 704, the RNC 504 determines whether an MBMS service ID is included in the RRC Connection Setup Request message.

If no MBMS service ID is included in the RRC Connection Setup Request message, the RNC 504 performs an RRC connection setup procedure for a general service (not shown). However, if an MBMS service ID is included in the RRC Connection Setup Request message, in step 706, the RNC 504 transmits an MBMS UE Validate Request message to the SGSN 506 in order to determine through the SGSN 506 whether the UE 502 is valid for the MBMS service. In step 708, the RNC 504 determines whether a validate response for the MBMS UE Validate Request message is received. If a validate response for the MBMS UE Validate Request message is received, the RNC 504 proceeds to step 712 in order to update an MBMS service context for the UE 502. However, if a validate response for the MBMS UE Validate Request message is not received, the RNC 504 transmits an MBMS Service Failure message to the UE 502 in step 710.

In step 712, the RNC 504 searches for an MBMS service context corresponding to the MBMS service ID. If it is determined in step 714 that there is no MBMS service context corresponding to the MBMS service ID, the RNC 504 generates a new MBMS service context corresponding to the MBMS service ID in step 720. Thereafter, in step 722, the RNC 504 adds an ID of the UE 502 to the newly created MBMS service context, and in step 724, the RNC 504 links the UE ID added to the MBMS service context with a corresponding UE context.

However, if it is determined in step 714 that there is an MBMS service context corresponding to the MBMS service ID, the RNC 504 searches in step 716 for the ID of the UE 502 stored in the searched MBMS service context. If it is determined in step 718 that the UE ID exists in the MBMS service context, the RNC 504 is not required to newly add the UE ID. However, if the UE ID does not exist in the MBMS service context, the RNC 504 adds the UE ID in step 722, and links the added UE ID with a corresponding UE context in step 724.

Referring to FIG. 14, if an RRC connection setup between the UE 502 and the RNC 504 is completed in step 730, the RNC 504 receives an MBMS Service Request message containing an MBMS service ID from the UE 502 in step 732. In step 734, the RNC 504 transmits an MBMS UE Validate Request message in order to inquire of the SGSN 506 about whether an MBMS service requested by the UE 502 is valid, in response to the MBMS Service Request message.

If it is determined in step 736 that a validate response for the MBMS UE Validate Request message is received, the RNC 504 proceeds to step 740 in order to update an MBMS service context in the RNC 504 for the UE 502. However, if it is determined in step 736 that a validate response for the MBMS UE Validate Request message is not received, the RNC 504 proceeds to step 738 where it transmits an MBMS Service Failure message to the UE 502.

In step 740, the RNC 504 searches for an MBMS service context corresponding to the MBMS service ID. If it is determined in step 742 that there is no MBMS service context corresponding to the MBMS service ID, the RNC 504 proceeds to step 748 where it creates a new MBMS service context corresponding to the MBMS service ID. Thereafter, the RNC 504 adds an ID of the UE 502 to the newly created MBMS service context in step 750, and links the UE ID added to the MBMS service context with a corresponding UE context in step 752.

However, if it is determined in step 742 that there is an MBMS service context corresponding to the MBMS service ID, the RNC 504 determines in step 744 whether an ID of the UE 502 is stored in the searched MBMS service context. If it is determined in step 746 that the UE ID exists in the MBMS service context, the RNC 504 is not required to newly add the UE ID. However, if the UE ID does not exist in the MBMS service context, the RNC 504 adds the UE ID to the MBMS service context in step 750, and links the added UE ID with a corresponding UE context in step 752.

Referring to FIG. 15, in step 760, the RNC 504 receives an RRC Connection Setup Request message from a UE 502 that has released PS signaling after joining an MBMS service. In step 762, the RNC 504 monitors whether an MBMS Service Request message, which is an RRC connection message or a dedicated RRC message, including an MBMS service activation indicator is received from the UE 502.

If the MBMS service activation indictor is received, in step 764, the RNC 504 transmits an MBMS Service List Request message to the SGSN 506 in order to request an MBMS service list including MBMS services the UE 502 has joined.

In step 766, the RNC 504 monitors whether an MBMS Service List Response message is successfully received from the SGSN 506 in response to the MBMS Service List Request message. If the RNC 504 fails to successfully receive the MBMS Service List Response message from the SGSN 506, in step 768, the RNC 504 transmits an MBMS Service Failure message to the UE 502 and then ends the operation.

However, if it is determined in step 766 that an MBMS Service List Response message containing at least one MBMS service ID for an MBMS service that the UE 502 has joined is received from the SGSN 506, the RNC 504 determines in step 770 searches for an MBMS service context corresponding to an MBMS service ID extracted from the MBMS Service List Response message If it is determined in step 772 that there is a corresponding MBMS service context, the RNC 504 proceeds to step 774. However, if the corresponding MBMS service context does not exist, the RNC 504 creates an MBMS service context corresponding to the MBMS service ID in step 778. Further, the RNC 504 adds ID information of the UE 502 to the created MBMS service context in step 780, and links the UE ID added to the MBMS service context with a corresponding UE context in step 782.

In step 774, the RNC 504 determines whether an ID of the UE 502 is included in the MBMS service context. If it is determined in step 776 that an ID of the UE 502 is not included in the MBMS service context, the RNC 504 adds information on the UE 502 to the MBMS service context in step 780. Thereafter, in step 782, the RNC 504 links an ID of the UE 502 with a corresponding UE context. However, if it is determined in step 776 that an ID of the UE 502 is included in the MBMS service context, the RNC 504 ends the operation.

Figure 16:
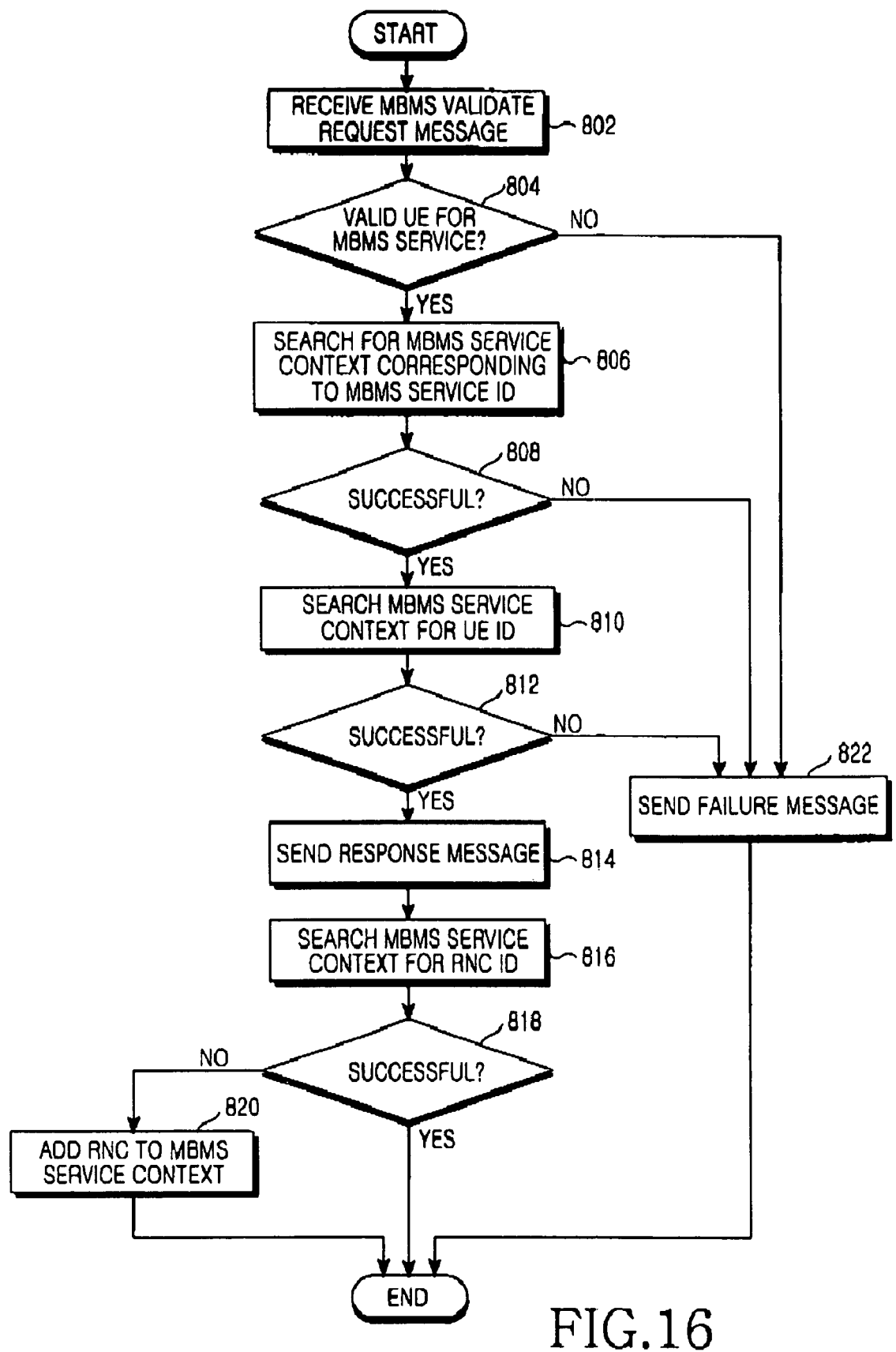
FIGS. 16 and 17 are flowcharts illustrating an operation of updating an MBMS service context by an SGSN according to the first embodiment of the present invention.

FIG. 16 is a flowchart illustrating an operation of the SGSN 506 that manages an MBMS service context in association with the procedures illustrated in FIGS. 7 and 8. Referring to FIG. 16, in step 802, the SGSN 506 receives from the RNC 504 an MBMS UE Validate Request message containing an MBMS service ID indicating an MBMS service that the UE 502 desires to receive. The MBMS UE Validate Request message additionally includes a UE ID of the UE 502 and an RNC ID of the RNC 504. The SGSN 506 can optionally perform MBMS service authentication on the UE 502 in response to the MBMS UE Validate Request message. That is, in step 804, the SGSN 506 determines whether the UE 502 has joined an MBMS service, thereby performing a service authentication operation.

If the service authentication on the UE 502 is successful, the SGSN 506 proceeds to step 806 where it determines whether there is an MBMS service context corresponding to the MBMS service ID. However, if the service authentication on the UE 502 is unsuccessful, the SGSN 506 transmits an MBMS UE Validate Failure message to the RNC 504 in order to inform that the UE 502 has not joined the MBMS service via the SGSN 506 in step 822.

If it is determined in step 808 that the MBMS service context does exist, in step 810, the SGSN 506 determines whether an ID of the UE 502 is included in the MBMS service context. However, if it is determined in step 808 that the MBMS service context does not exist, the SGSN 506 proceeds to step 822 where it sends an MBMS UE Validate Failure message to the RNC 504 to inform that the UE 502 has not joined the MBMS service via the SGSN 506, and then ends the operation.

If it is determined in step 812 that an ID of the UE 502 is not included in the MBMS service context, the SGSN 506 transmits in step 822 the MBMS UE Validate Failure message to the RNC 504 to inform that the UE 502 has not joined the MBMS service via the SGSN 506. However, if it is determined in step 812 that an ID of the UE 502 is included in the MBMS service context, in step 814, the SGSN 506 transmits an MBMS UE Validate Response message to the RNC 504 to inform that the UE 502 has joined the MBMS service via the SGSN 506.

In step 816, the SGSN 506 searches for an RNC ID of the RNC 504 in the MBMS service context. If it is determined in step 818 that an RNC ID of the RNC 504 is not included in the MBMS service context, the SGSN 506 adds information on the RNC 504 to the MBMS service context in step 820. However, if it is determined in step 818 that an RNC ID of the RNC 504 is already included in the MBMS service context, the SGSN 506 ends the operation.

Figure 17:
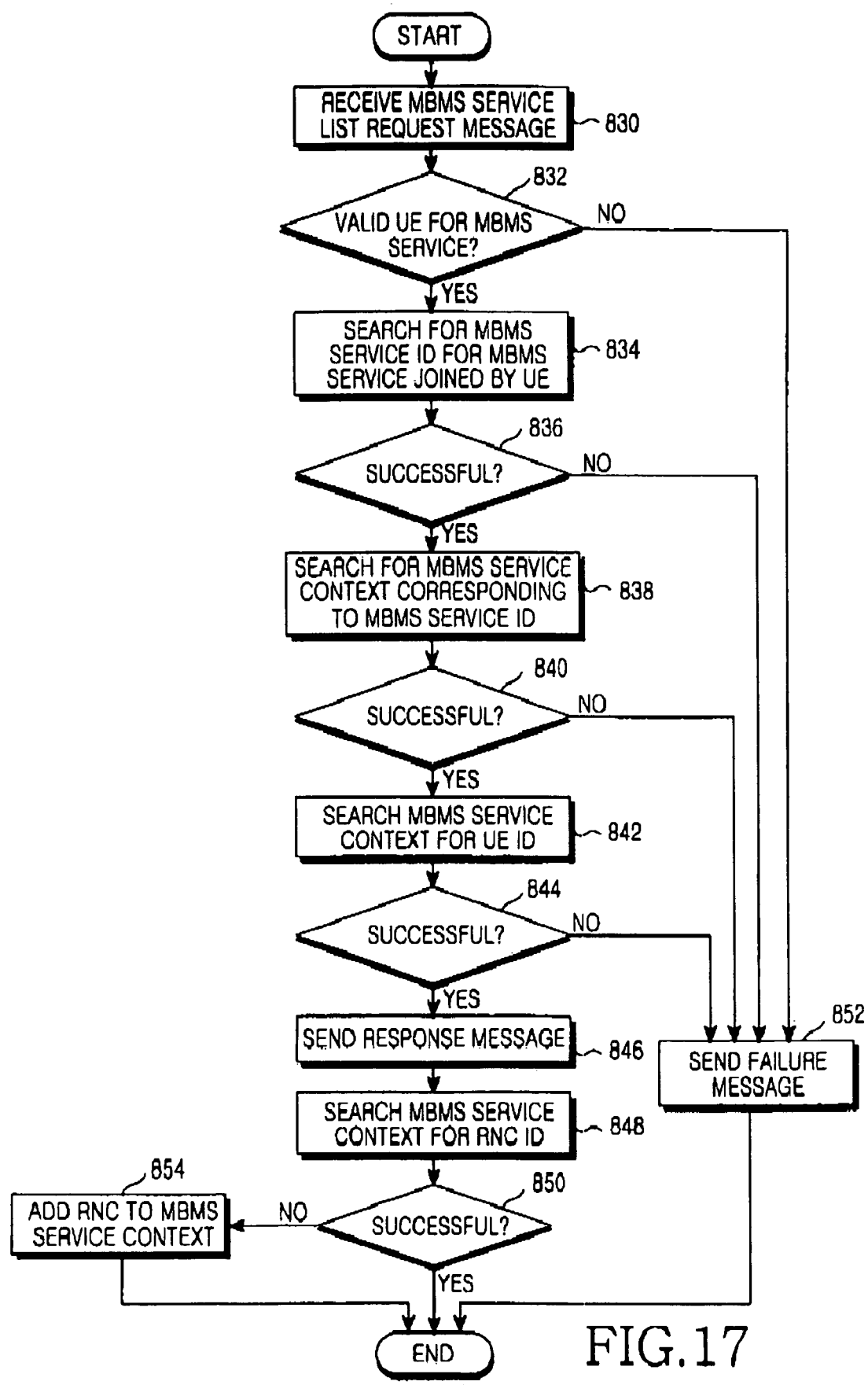

FIG. 17 is a flowchart illustrating an operation of the SGSN 506 that manages an MBMS service context in association with the procedure illustrated in FIG. 9. Referring to FIG. 17, in step 830, the SGSN 506 receives from the RNC 504 an MBMS Service List Request message for requesting an MBMS service list including MBMS services that the UE 502 has joined.

In step 832, the SGSN 506 can optionally perform MBMS service authentication on the UE 502. If the service authentication is unsuccessful, in step 852, the SGSN 506 transmits an MBMS Service List Failure message to the RNC 504 to inform that the UE 502 has not joined any MBMS service via the SGSN 506, and then ends the operation. However, if the service authentication is successful, the SGSN 506 searches a context of the UE 502 for MBMS service IDs for MBMS services that the UE 502 has joined via the SGSN 506, in step 834.

If it is determined in step 836 that searching for the MBMS service IDs is unsuccessful, the SGSN 506 transmits in step 852 an MBMS Service List Failure message to the RNC 504 to inform that the UE 502 has not joined any MBMS service via the SGSN 506, and then ends the operation. However, if it is determined in step 836 that searching for the MBMS service IDs is successful, in step 838, the SGSN 506 searches for an MBMS service context corresponding to the MBMS service ID searched in the step 836. If it is determined in step 840 that searching for the MBMS service context is unsuccessful, in step 852, the SGSN 506 transmits an MBMS Service List Failure message to the RNC 504 to inform that the UE 502 has not joined any MBMS service via the SGSN 506, and then ends the operation.

However, if it is determined in step 840 that the MBMS service context exists, in step 842, the SGSN 506 searches for an ID of the UE 502 in the MBMS service context. If it is determined in step 844 that an ID of the UE 502 is not included in the MBMS service context, in step 852, the SGSN 506 transmits an MBMS Service List Failure message to the RNC 504 to inform that the UE 502 has not joined any MBMS service via the SGSN 506, and then ends the operation.

In an alternative embodiment, although an ID of the UE 502 is not included in the MBMS service context, if the UE 502 has normally joined the MBMS service, the SGSN 506 adds information on the UE 502 to the MBMS service context without transmitting the MBMS Service List Failure message.

However, if it is determined in step 844 that an ID of the UE 502 is included in the MBMS service context, in step 846, the SGSN 506 transmits an MBMS Service List Response message to the RNC 504 to inform that the UE 502 has joined the MBMS service via the SGSN 506. The MBMS Service List Response message, as described in step 560 of FIG. 9, includes information on MBMS service(s) that the UE 502 corresponding to a UE ID included in the MBMS Service List Request message received in step 830 is currently joining, i.e., includes an MBMS service ID list.

In step 848, the SGSN 506 searches for an RNC ID of the RNC 504 in the MBMS service context. If it is determined in step 850 that an RNC ID of the RNC 504 is not included in the MBMS service context, the SGSN 506 adds information on the RNC 504 to the MBMS service context in step 854. However, if it is determined in step 850 that an RNC ID of the RNC 504 is included in the MBMS service context, the SGSN 506 ends the operation.

2. Management of a Service Context in an SGSN

In a second embodiment of the present invention, in order to enable an SGSN to manage information on a UE that joined an MBMS service but is in a PMM-Idle/RRC-Connected mode, MBMS service-related information indicating that the UE is a terminal that successfully joined the MBMS service is transmitted to the SGSN via an RNC along with a predetermined message. The SGSN updates information on the UE in a corresponding MBMS service context requested by the UE among MBMS service contexts managed by the SGSN. Accordingly, the SGSN can manage a list of UEs that have set up RRC connection for a CS service together with its MBMS service context.

The MBMS service-related information corresponds to an MBMS service ID indicating an MBMS service that the terminal joined, or an MBMS service activation indicator.

FIGS. 18 to 21 are diagrams illustrating procedures for adding information on a UE to an MBMS service context of an SGSN associated with the UE that joined an MBMS service but is in a PMM-Idle mode. In FIGS. 18 to 21, reference numeral 902 represents a UE receiving an MBMS service, reference numeral 904 represents an RNC for an MBMS service, associated with the UE 902, and reference numeral 906 represents an SGSN of a CN for the MBMS service. In addition, an MBMS service context of the SGSN 906 will be referred to as a "first MBMS service context," and an MBMS service context of the RNC 904 will be referred to as a "second MBMS service context." The UE 902 is a UE that joined a desired MBMS service but is in a PMM-Idle mode where there is no PS service currently in operation via the SGSN 906. In the PMM-Idle mode, because no SRNC exists for the UE 902 receiving an MBMS service, the SGSN 906 doest not transmit MBMS service-related information to the RNC 904 where the UE 902 is currently located.

Figure 18:
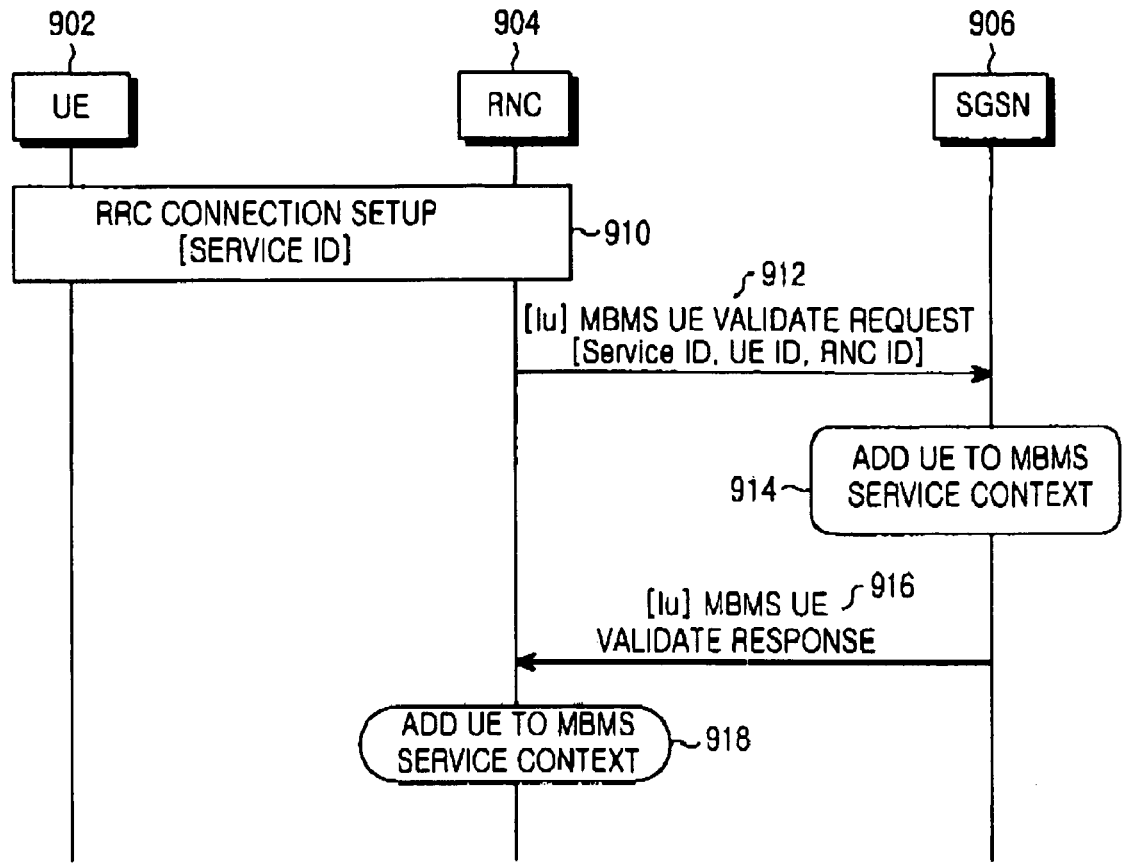
FIGS. 18 to 21 are diagrams illustrating procedures for transmitting MBMS service-related information to an RNC and an SGSN when a UE joining an MBMS service performs RRC connection setup, according to a second embodiment of the present invention.
Figure 19:
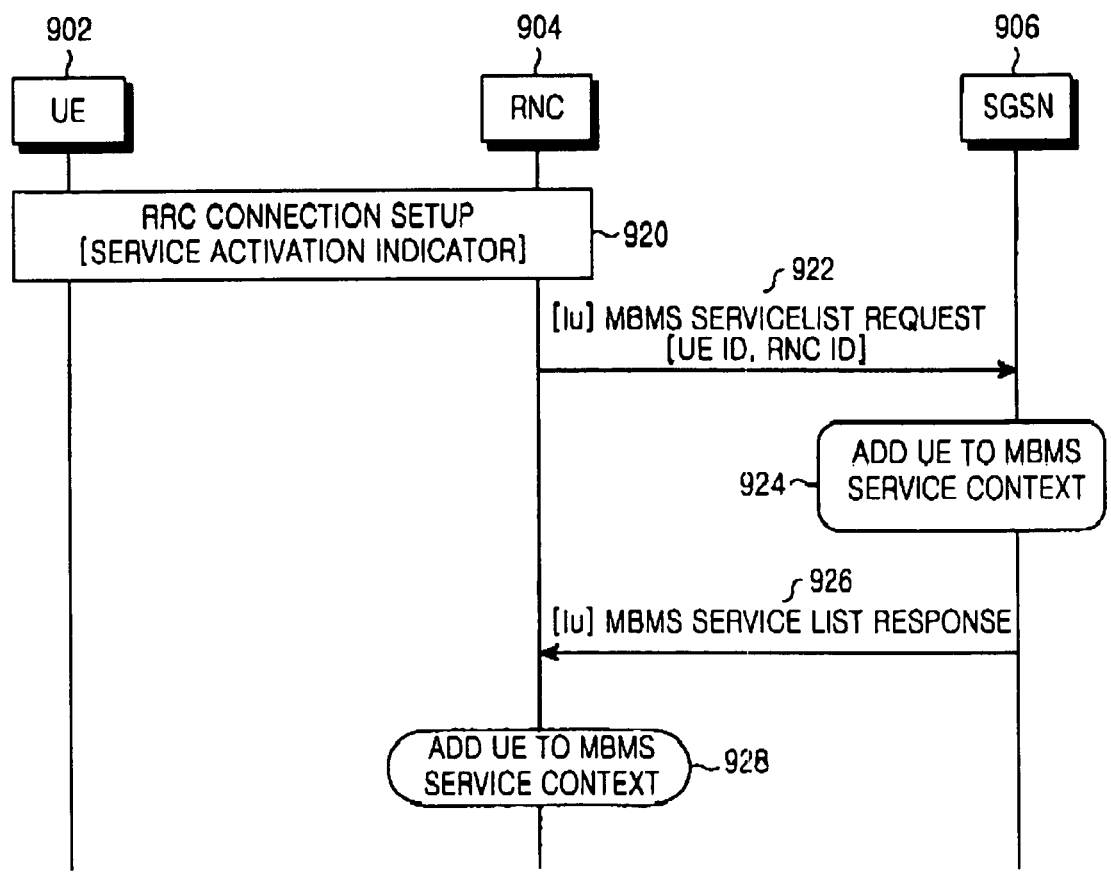

More specifically, FIGS. 18 and 19 are diagrams illustrating procedures for storing MBMS service-related information when the UE 902 requests the RNC 904 to set up RRC connection for a CS service. Referring to FIG. 18, in step 910, the UE 902 sets up an RRC connection to the RNC 904 in order to receive a CS service. At this point, the UE 902 inserts a desired MBMS service ID into an RRC Connection Setup Request message or an RRC Connection Setup Complete message transmitted to the RNC 904, in order to request the RNC 904 to add information on the UE 902 to an MBMS service context corresponding to the MBMS service ID. If the RRC connection is successfully set up between the UE 902 and the RNC 904, the RNC 904 transmits in step 912 an MBMS UE Validate Request message to the SGSN 906 in order to request the SGSN 906 to determine whether the UE 902 has joined the MBMS service. The MBMS UE Validate Request message includes a UE ID of the UE 902, the MBMS service ID, and an RNC ID of the RNC 904.

The SGSN 906 determines whether a second MBMS service context corresponding to the MBMS service ID included in the MBMS UE Validate Request message exists and whether the UE ID exists in the second MBMS service context. If the MBMS service ID included in the MBMS UE Validate Request message exists and the UE ID exists in the second MBMS service context, the SGSN 906 transmits in step 916 an MBMS UE Validate Response message to the RNC 904 in order to inform that the UE 902 is valid for the MBMS service. The MBMS UE Validate Response message can include a UE list of UEs valid for the MBMS service and information on the areas where the MBMS service is available.

In an alternative embodiment, the SGSN 906 determines that the UE 902 is valid for the MBMS service, when an MM context corresponding to the UE ID included in the MBMS UE Validate Request message exists in the SGSN 906 and an MBMS service context corresponding to the MBMS service ID exists in the MM context.

In step 914, the SGSN 906 receiving the MBMS UE Validate Request message stores UE information indicating that the UE 902 is in an RRC-Connected, i.e., CMM-Connected mode for a CS service, in the second MBMS service context. In step 918, the RNC 904 adds information on the UE 902 to a first MBMS service context thereof in response to the MBMS UE Validate Response message.

Referring to FIG. 19, in step 920, the UE 902 sets up an RRC connection to the RNC 904 in order to receive a CS service. Here, the UE 902 inserts an MBMS service activation indicator indicating that there is at least one MBMS service that the UE 902 has joined, into an RRC Connection Setup Request message or an RRC Connection Setup Complete message transmitted to the RNC 904. The MBMS service activation indicator is set when the UE 902 has joined one or more MBMS services.

If RRC connection is successfully established between the UE 902 and the RNC 904, in step 922, the RNC 904 transmits an MBMS Service List Request message to the SGSN 906 in order to request the SGSN 906 to determine whether the UE 902 has joined a certain MBMS service. The MBMS Service List Request message includes a UE ID of the UE 902 and an RNC ID of the RNC 904.

When an MM context corresponding to the UE ID included in the MBMS Service List Request message exists in the SGSN 906 and an MBMS service context exists in the MM context, in step 926 the SGSN 906 transmits an MBMS Service List Response message containing MBMS service IDs included in the MM context, to the RNC 904. That is, the MBMS Service List Response message includes a list of MBMS service IDs for all MBMS services that the UE 902 has joined. In addition, the MBMS Service List Response message can include information on the areas where at least one MBMS service that the UE 902 has joined is available.

In step 924, in response to the MBMS Service List Request message, the SGSN 906 stores UE information indicating that the UE 902 is in an RRC-Connected, i.e., CMM-Connected mode for a CS service, in the MBMS service context. In step 928, the RNC 904 adds UE information of the UE 902 to its own MBMS service context in response to the MBMS Service List Response message.

Above, an embodiment where the UE uses an MBMS service ID and another embodiment where the UE uses an MBMS service activation indictor have been separately described. However, in a modified embodiment of the present invention, the UE can use both the MBMS service ID and the MBMS service activation indictor. That is, when the UE joins only one MBMS service, it transmits the MBMS service ID to an SGSN via an RNC, and when the UE joins two or more MBMS services, it transmits the MBMS service activation indicator to the SGSN via the RNC. As a result, the SGSN receives one of the two types of information through an MBMS UE Validate Request message or an MBMS Service List Request message from the RNC, adds information on the UE to its own MBMS service context through the above-described procedure, and transfers a response thereto to the RNC.

Figure 20:
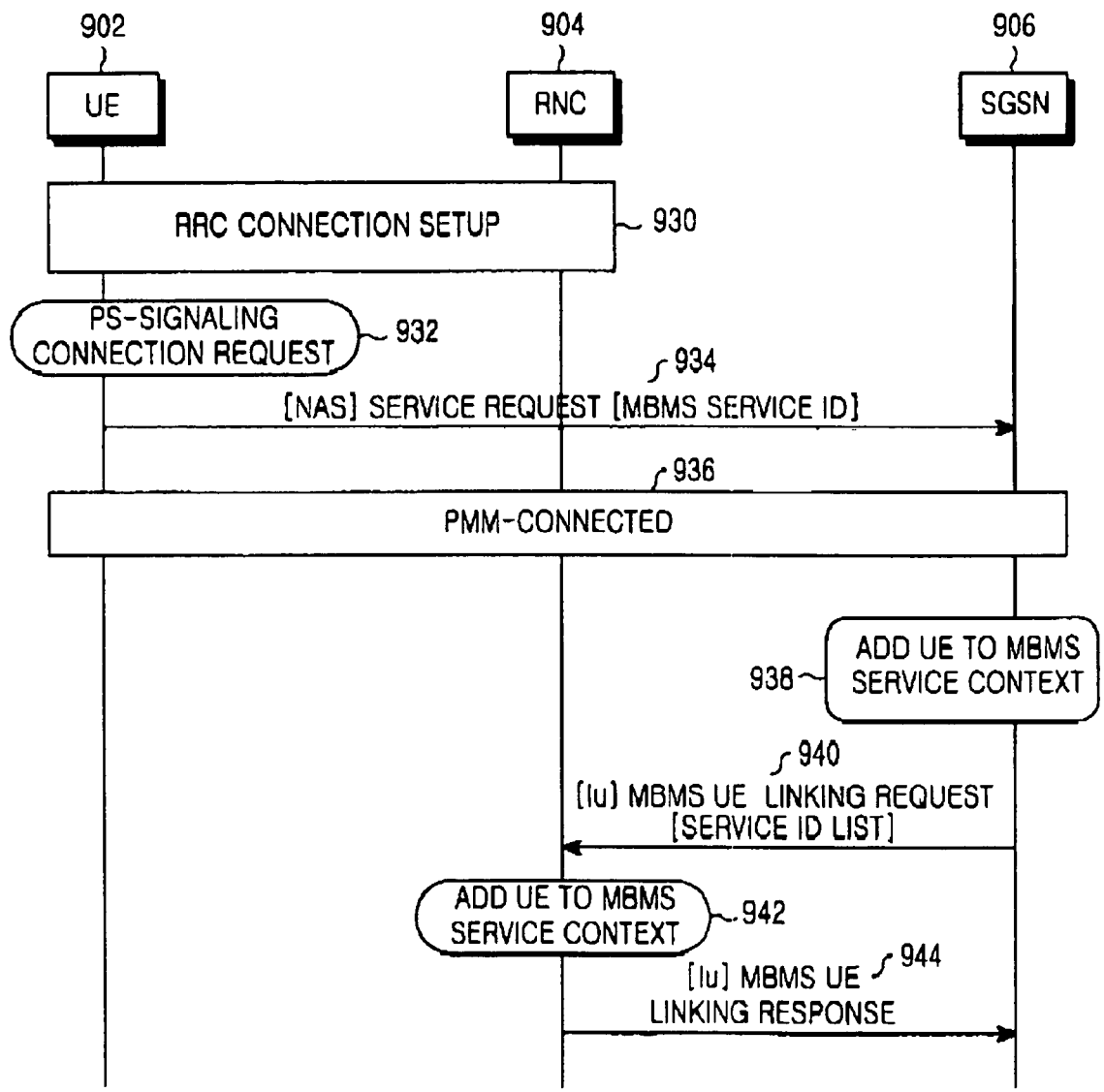

FIG. 20 is a diagram illustrating a procedure in which the UE 902 receiving an MBMS service in a PMM-Idle state transitions to a PMM-Connected mode by requesting a PS network to set up connection while requesting the RNC 904 to set up RRC connection for a CS service, and stores MBMS service-related information in the RNC 904 and the SGSN 906. Referring to FIG. 20, in step 930, the UE 902 sets up an RRC connection to the RNC 904 in order to receive a CS service. In step 932, the UE 902 determines to also request PMM-Signaling connection when requesting the RRC connection while it joins an MBMS service. That is, an RRC layer of the UE 902 requests an upper layer to transition to a PMM-Connected mode. Here, the "upper layer" refers to a packet mobility management (PMM) entity. If the PMM entity determines to connect PS signaling in response to a request from the RRC layer, in step 934, the UE 902 transmits a Service Request message to the SGSN 906 through a NAS interface in order to request connection of PS signaling, and then transitions to a PMM-Connected mode in step 936. The following operation between the SGSN 906 and the RNC 904 follows an MBMS UE Linking procedure for a UE in a PMM-Connected mode.

The Service Request message includes either an MBMS service ID or an MBMS service activation indicator. The MBMS service activation indicator is added to the Service Request message as an information element (IE), or added to NAS messages as a Cause Value (e.g., Cause="MBMS Service Activation").

In step 938, the SGSN 906 changes state information of the UE 902 in an MM context of the UE 902 to PMM-Connected in response to the Service Request message. In step 940, the SGSN 906 transfers an MBMS service ID list of the UE 902 to the RNC 904 through an MBMS UE Linking Request message. In step 942, the RNC 904 adds information on the UE 902 to a corresponding MBMS service context in the RNC 904 by consulting the MBMS service ID list. In step 944, the RNC 904 sends an MBMS UE Linking Response message to the SGSN 906 to inform that information on the UE 902 has been successfully added to its own MBMS service context.

Figure 21:
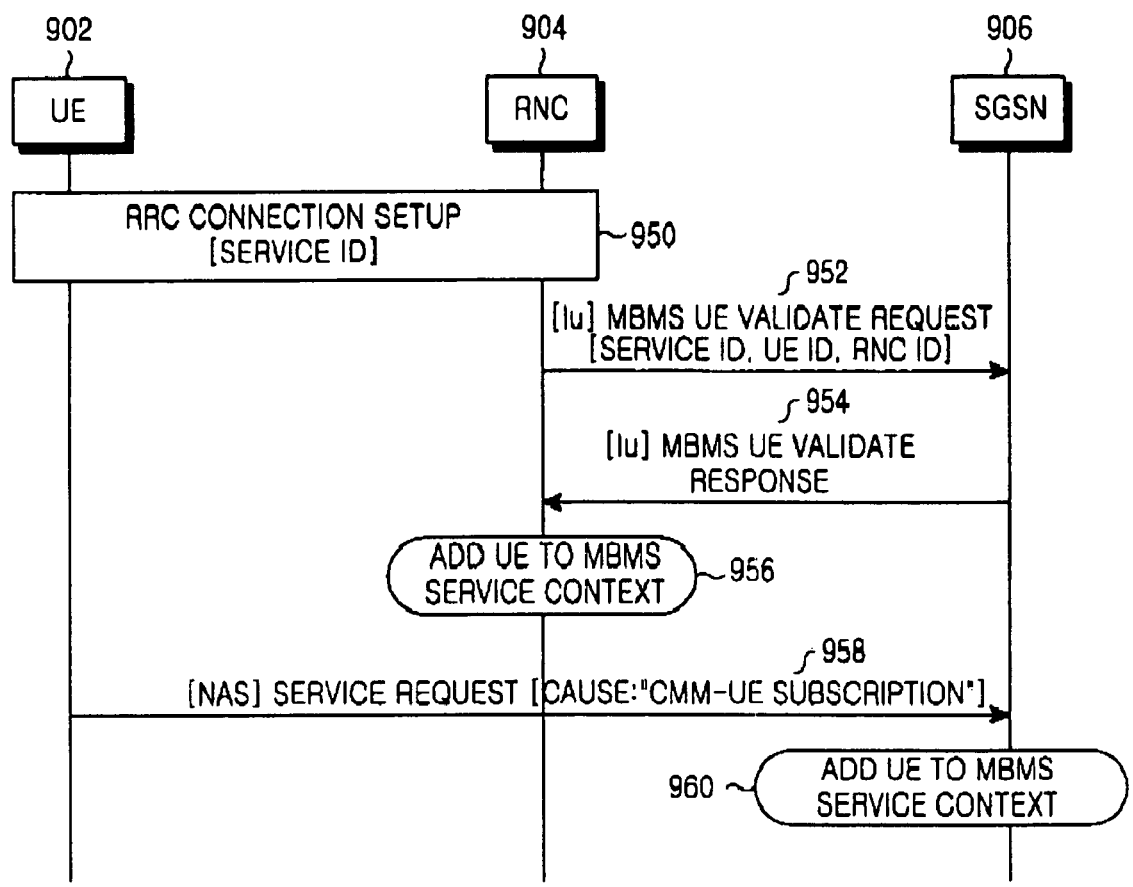

FIG. 21 is a diagram illustrating a procedure in which when requesting the RNC 904 to set up RRC connection for a CS service, the UE 902 receiving an MBMS service in a PMM-Idle state stores MBMS service-related information from the UE 902 to the RNC 904 through a Uu message and stores MBMS service-related information from the UE 902 to the SGSN 906 through a NAS message. In this procedure, MBMS service-related information transmitted to the SGSN 906 includes an MBMS service ID or an MBMS service activation indicator. In the following description, it will be assumed that the MBMS service ID is used as the MBMS service-related information.

Referring to FIG. 21, in step 950, the UE 902 sets up an RRC connection to the RNC 904 in order to receive a CS service. Here, at least one MBMS service ID indicating an MBMS service that the UE 902 has joined is included in an RRC connection message, i.e., an RRC Connection Setup Request message or an RRC Connection Setup Complete message, being transmitted from the UE 902 to the RNC 904 in order to set up RRC connection for a CS service. If the RRC connection between the UE 902 and the RNC 904 is successfully set up, in step 952, the RNC 904 transmits an MBMS UE Validate Request message to the SGSN 906 in order to request the SGSN 906 to determine whether the UE 902 has joined the MBMS service. The MBMS UE Validate Request message includes a UE ID of the UE 902, the MBMS service ID, and an RNC ID of the RNC 904.

When an MBMS service context corresponding to the MBMS service ID exists in the SGSN 906 and the UE ID exists in the MBMS service context, in step 954, the SGSN 906 transmits an MBMS UE Validate Response message to the RNC 904 to inform that the UE 902 is valid for the MBMS service. The MBMS UE Validate Response message can also include information on the areas where the MBMS service is available.

In addition, if an MM context corresponding to the UE ID exists in the SGSN 906 and an MBMS service context corresponding to the MBMS service ID exists in the MM context, the SGSN 906 receiving the MBMS UE Validate Request message determines that the UE 902 is valid for the MBMS service. In step 956, the RNC 904 stores UE information indicating that the UE 902 is in a CMM-Connected mode, in the MBMS service context associated with the MBMS service.

An RRC entity of the UE 902 reports completion of RRC connection to an upper layer of the UE 902 after setting up RRC connection in step 950. Here, the "upper layer" refers to a PMM entity. If the PMM entity determines to connect PS signaling in response to a request from the RRC layer, in step 958 the UE 902 transmits a message informing the SGSN 906 that Linking information between the UE 902 and the MBMS service exists in the RNC 904 even though the UE 902 is in a CMM-Connected or PMM-Idle state, using a NAS interface. The above-described message is transmitted from the UE 902 to the SGSN 906, and includes a parameter indicating that linking information between the UE 902 and the MBMS service exists in the RNC 904 even though the UE 902 is in a CMM-Connected or PMM-Idle state.

In addition, the above-described message corresponds to a dedicated Service Request message for MBMS service request or a typical Service Request message to which a Cause Value having a value indicating MBMS service request is added. When the message is a dedicated Service Request message, the Service Request message includes a flag such as CMM-Connected. CMM-Connected=0 represents a CMM-Idle state, and CMM-Connected=1 represents a CMM-Connected state. When the message is a typical Service Request message to which a parameter is added, the Service Request message includes the MBMS service ID or a Cause Value having a new value indicating a CMM-Connected state.

The Service Request message can become a dedicated message for MBMS service request or an existing Service Request message to which a Cause Value having a new value is added. When the Service Request message is defined as a dedicated message, the Service Request message includes a flag such as CMM-Connected. Likewise, CMM-Connected=0 indicates a CMM-Idle state, and CMM-Connected=1 indicates a CMM-Connected state.

In step 960, the SGSN 906 stores UE information indicating that the UE 902 is in a CMM-Connected state, in an MBMS service context corresponding to the MBMS service in response to the Service Request message. That is, the SGSN 906 stores the UE information in the MBMS service context corresponding to the MBMS service joined by the UE 902. Here, if the Service Request message includes the MBMS service ID, the SGSN 906 searches the MBMS service context using the MBMS service ID. However, if the Service Request message does not include the MBMS service ID, the SGSN 906 searches an MM context using the UE ID, and then acquires the MBMS service context included in the MM context.

After receiving the Service Request message in step 958 and updating its own MBMS service context, the SGSN 906 determines whether MBMS service-related information (such as an MBMS UE Validate Request message) for the UE 902 is received from the RNC 904. If the MBMS service-related information is not received, the SGSN 906 transmits to the RNC 904 an MBMS UE Linking Request message containing at least one MBMS service ID for an MBMS service that the UE 902 has joined so that the RNC 904 can store information on the UE 902 in its own MBMS service context.

Although not illustrated, in a modified embodiment of the present invention, in transmitting a Service Request message to the SGSN 906, the UE 902 uses an MBMS service ID when it joins only one MBMS service, and uses an MBMS service activation indicator when it joins two or more MBMS services. The following operation in the modified embodiment is the same as the corresponding operation as described above.

The reason for adding CMM-Connected information to the MBMS service context of an SGSN in this manner is to delete linking information for a UE in an RNC when the UE in a PMM-Idle/RRC-Connected state makes a service delete request. That is, through the procedures illustrated in FIGS. 18 to 21, if the SGSN detects that the UE has RRC connection and the RNC stores the MBMS service-related information of the UE, then the SGSN uses the information in deleting linking between the UE and the MBMS service through delinking from the RNC when the UE makes an MBMS service leave request.

Figure 22:
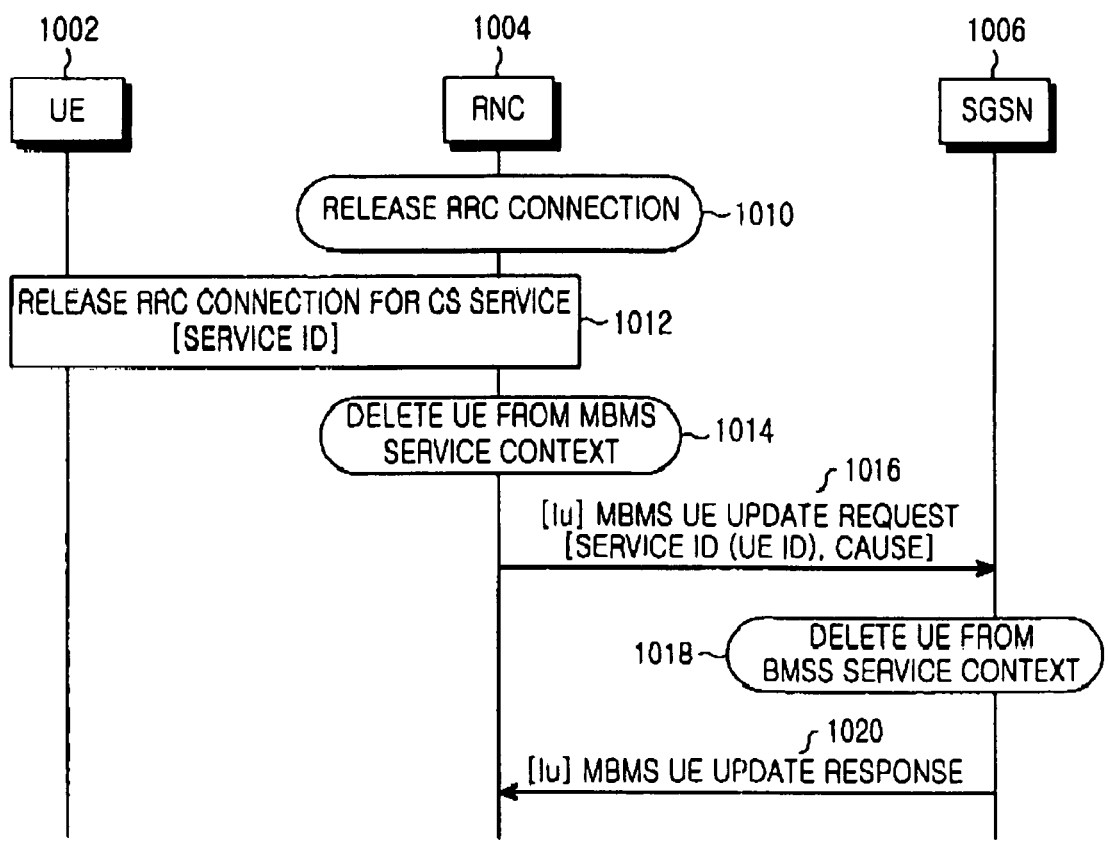
FIG. 22 is a diagram illustrating a procedure for releasing RRC connection by an RNC and an SGSN according to another preferred embodiment of the present invention.
Figure 23:
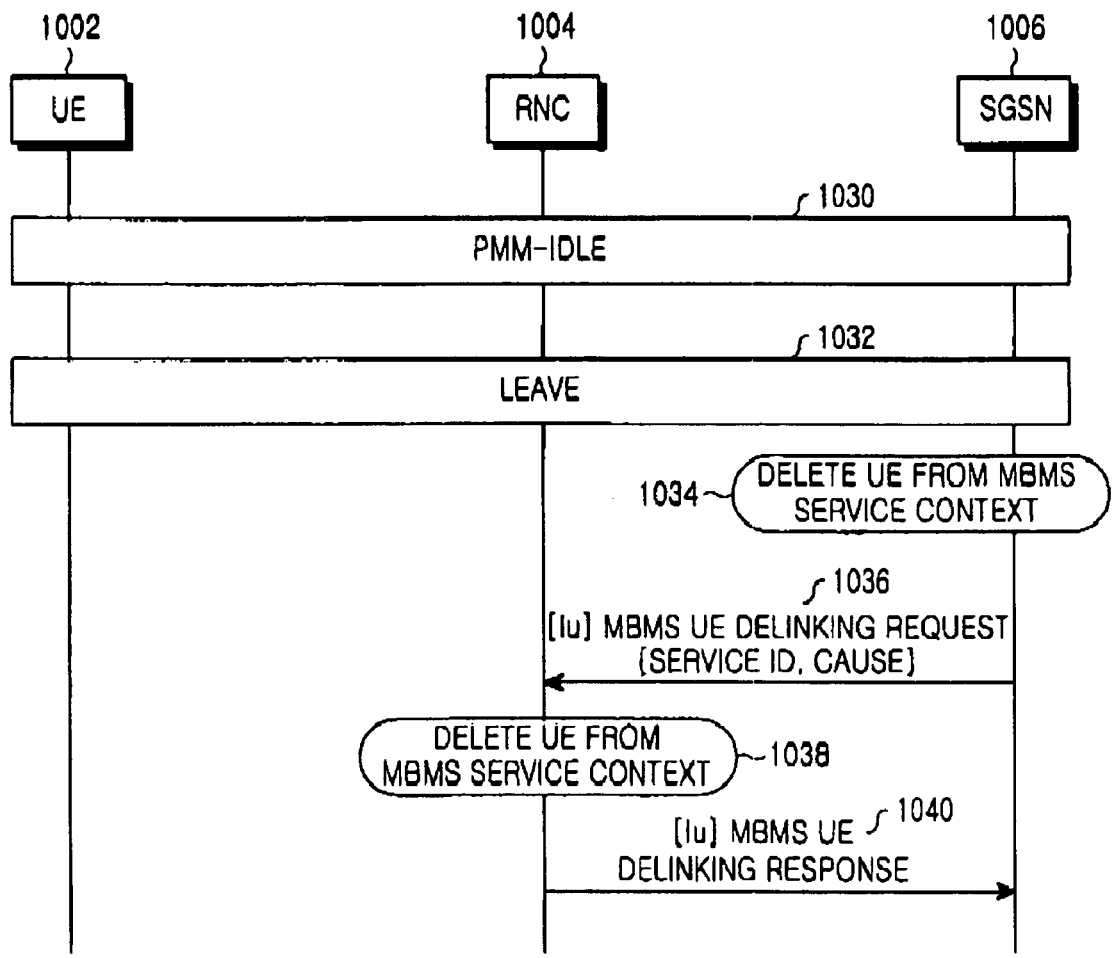
FIG. 23 is a diagram illustrating a procedure for requesting an RNC and an SGSN to leave an MBMS service according to another preferred embodiment of the present invention.

FIGS. 22 and 23 are diagrams illustrating procedures for deleting MBMS service-related information of a UE from MBMS service contexts of an SGSN and an RNC. In FIGS. 22 and 23, reference numeral 1002 represents a UE receiving an MBMS service, reference numeral 1004 represents an RNC for a corresponding MBMS service, associated with the UE 102, and reference numeral 1006 represents an SGSN of a CN for the MBMS service. Additionally, the UE 1002 is in a state where it has joined an MBMS service but has no other PS service in progress via the SGSN 1006.

More specifically, FIG. 22 is a diagram illustrating a procedure in which a UE receiving an MBMS service in a PMM-Idle state deletes MBMS service-related information in an RNC and deletes MBMS service-related information in an SGSN through an Iu message from the RNC to the SGSN, in releasing RRC connection set up for a CS service. Referring to FIG. 22, if a CS service of the UE 1002 is released (or suspended) in step 1010, the RNC 1004 sends an RRC Connection Release message to the UE 1002 in step 1012. The RRC Connection Release message transmitted from the UE 1002 to the RNC 1004 includes an MBMS service ID indicating an MBMS service in progress by the UE 1002.

In step 1014, the RNC 1004 deletes information on the UE 1002 from its own MBMS service context. Thereafter, in step 1016, the RNC 1004 informs the SGSN 1006 that because the UE 1002 released RRC connection, the linking between the UE 1002 and the MBMS service does not exist any longer in the RNC 1004. In step 1016, an MBMS UE Update Request message including the MBMS service ID and the UE ID is used. The MBMS UE Update Request message further includes a parameter Cause indicating that the UE 1002 has transitioned from the CMM-Connected mode to the CMM-Idle mode, in addition to the MBMS service ID and the UE ID.

In step 1018, the SGSN 1006 deletes UE information indicating that the UE 1002 is in a CMM-Connected mode, from an MBMS service context in the SGSN 1006 by consulting the MBMS UE Update Request message. In step 1020, the SGSN 1006 responds to the RNC 1004 with an MBMS UE Update Response message.

FIG. 23 is a diagram illustrating a procedure for deleting MBMS service-related information through an Iu message transmitted from an SGSN 1006 to an RNC 1004 when a UE 1002 receiving an MBMS service in a PMM-Idle state requests suspension of an MBMS service while managing RRC connection set up for a CS service. Referring to FIG. 23, the UE 1002 determines to suspend reception of at least one MBMS service in progress in step 1030, and informs the SGSN 1006 of intended suspension of the MBMS service through a general MBMS Service Leave procedure in step 1032. In step 1034, the SGSN 1006 deletes UE information indicating that the UE 1002 is in a CMM-Connected mode, from an MBMS service context for the MBMS service, suspension of which was requested by the UE 1002. Additionally in step 1034, the SGSN 1006 first determines whether the UE information is stored in the MBMS service context, before deleting the UE information. If the UE information is stored in the MBMS service context, the SGSN 1006 transmits an MBMS UE Delinking Request message containing an MBMS service ID indicating an MBMS service that the UE 1002 desires to leave, to the RNC 1004 in step 1036. The MBMS UE Delinking Request message includes the MBMS service ID. Here, because the MBMS UE Delinking Request message is transmitted through UE dedicated signaling based on an Iu interface, the RNC 1004 can distinguish the UE 1002 that transmitted the message.

In step 1038, the RNC 1004 determines whether the UE 1002 included in an MBMS service context of the RNC 1004 is the last UE. If the UE 1002 is the last UE linked to the MBMS service context of the RNC 1004, the RNC 1004 deletes UE information of the UE 1002 from the MBMS service context, and in step 1040, transmits an MBMS UE Delinking Response message to the SGSN 1006 in response to the MBMS UE Delinking Request message.

Figure 24:
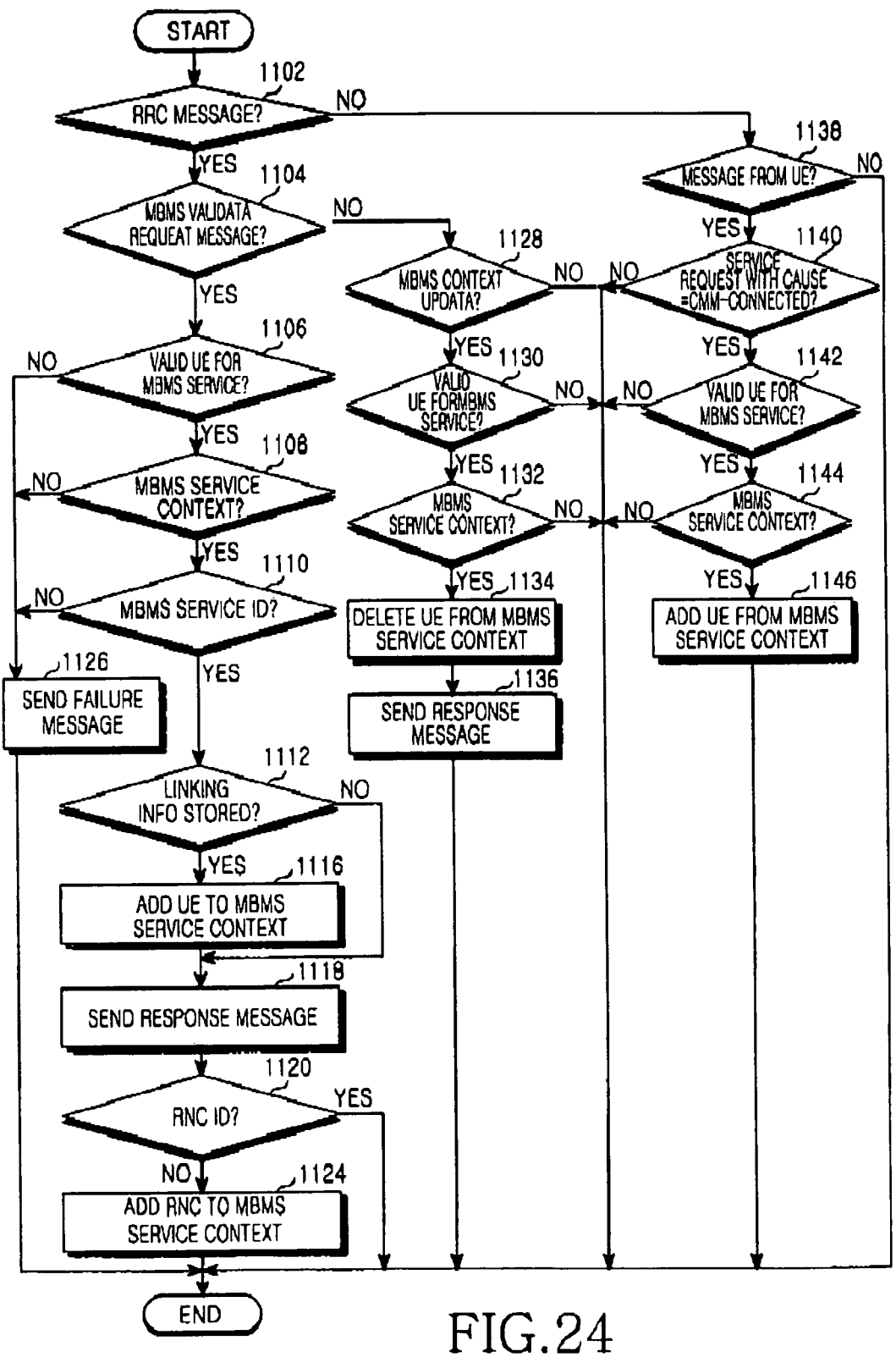
FIG. 24 is a flowchart illustrating an SGSN's operation for storing MBMS service-related information according to the second embodiment of the present invention.

FIG. 24 is a flowchart illustrating an operation of the SGSN 1006 according to the second embodiment of the present invention. Referring to FIG. 24, in step 1102, an SGSN determines whether a message received from a UE via an RNC is an RRC connection message. If the received message is an RRC connection message, the SGSN proceeds to step 1104, and if the received message is not an RRC connection message, the SGSN proceeds to step 1138.

In step 1104, the SGSN determines whether an MBMS UE Validate Request message, i.e., a message for requesting the SGSN to check whether the UE is valid for a particular MBMS service, is received from the RNC. The MBMS UE Validate Request message includes a UE ID and an RNC ID, and may further include an MBMS service ID indicating the particular MBMS service. If the MBMS UE Validate Request message is received, the SGSN proceeds to step 1106, and if the MBMS UE Validate Request message is not received, the SGSN proceeds to step 1128.

In step 1106, the SGSN optionally performs MBMS service authentication on the UE, and if the service authentication is successful, the SGSN proceeds to step 1108. However, if the service authentication is unsuccessful, the SGSN proceeds to step 1126

In step 1108, the SGSN determines whether there is an MBMS service context corresponding to the MBMS service ID. If it is determined in step 1108 that the MBMS service context exists, the SGSN proceeds to step 1110. However, if the MBMS service context does not exist, the SGSN proceeds to step 1126.

In step 1110, the SGSN determines whether the MBMS service ID is included in the MBMS service context. If it is determined in step 1110 that the MBMS service ID is included in the MBMS service context, the SGSN proceeds to step 1112. However, if the MBMS service ID is not included in the MBMS service context, the SGSN proceeds to step 1126.

In step 1126, the SGSN transmits an MBMS UE Validate Failure message to the RNC to inform that the UE has not joined the MBMS service via the SGSN, and then ends the operation.

In step 1112, the SGSN determines whether to store linking information. If the SGSN determines to store the linking information, it proceeds to step 1116, and if the SGSN determines not to store the linking information, it proceeds to step 1118. Here, the SGSN determines to store the linking information according to a predetermined operation mode when the UE directly stores MBMS service-related information of the UE in the RNC through a Uu message and the RNC transmits an Iu message to the SGSN to inform that RRC connection is set up.

In step 1116, the SGSN stores UE information indicating that the UE is in a CMM-Connected mode, in the MBMS service context, and then proceeds to step 1118, in which the SGSN transmits to the RNC an MBMS UE Validate Response message indicating that the UE has joined the MBMS service via the SGSN, and then proceeds to step 1120.

In step 1120, the SGSN determines whether the RNC ID is included in the MBMS service context. If it is determined that the RNC ID is not included in the MBMS service context, the SGSN proceeds to step 1124, where the SGSN adds information on the RNC to the MBMS service context. However, if it is determined that the RNC ID is included in the MBMS service context in step 1120, the SGSN ends the operation.

In step 1128, the SGSN determines whether an MBMS UE Update message is received from the RNC. If the MBMS UE Update message is received, the SGSN proceeds to step 1130, but if the MBMS UE Update message is not received, the SGSN ends the operation.

In step 1130, the SGSN optionally performs MBMS service authentication on the UE, and if the service authentication is successful, the SGSN proceeds to step 1132 determining that the UE is valid for the MBMS service. However, if the service authentication is unsuccessful, the SGSN ends the operation. In step 1132, the SGSN determines whether there is an MBMS service context corresponding to the MBMS service ID. If the MBMS service context exists in step 1132, the SGSN proceeds to step 1134, but if the MBMS service context does not exist in step 1132, the SGSN ends the operation. In step 1134, the SGSN deletes UE information indicating that the UE is in a CMM-Connected mode, from the MBMS service context. In step 1136, the SGSN transmits a response message to the RNC.

In step 1138, the SGSN determines whether the message received from the UE is a Service Request message containing CMM-Connected mode information. If the received message is the Service Request message, the SGSN proceeds to step 1140. The Service Request message includes an MBMS service ID. However, if the received message is not the Service Request message in step 1138, the SGSN ends the operation.

In step 1140, the SGSN determines whether a cause of a Service Request message is CMM-Connected mode. If a cause of the message is CMM-Connected mode, the SGSN proceeds to step 1142, but if a cause of the message is not CMM-Connected mode, the SGSN ends the operation.

In step 1142, the SGSN optionally performs MBMS service authentication on the UE. If the service authentication is unsuccessful, the SGSN ends the operation. However, if the service authentication is successful, the SGSN proceeds to step 1144 determining that the UE is valid for the MBMS service.

In step 1144, the SGSN determines whether there is an MBMS service context corresponding to the MBMS service ID. If the MBMS service context exists, the SGSN proceeds to step 1146, but if the MBMS service context does not exist, the SGSN ends the operation. In step 1146, the SGSN adds UE information indicating that the UE is in a CMM-Connected mode, to the MBMS service context.

Figure 25:
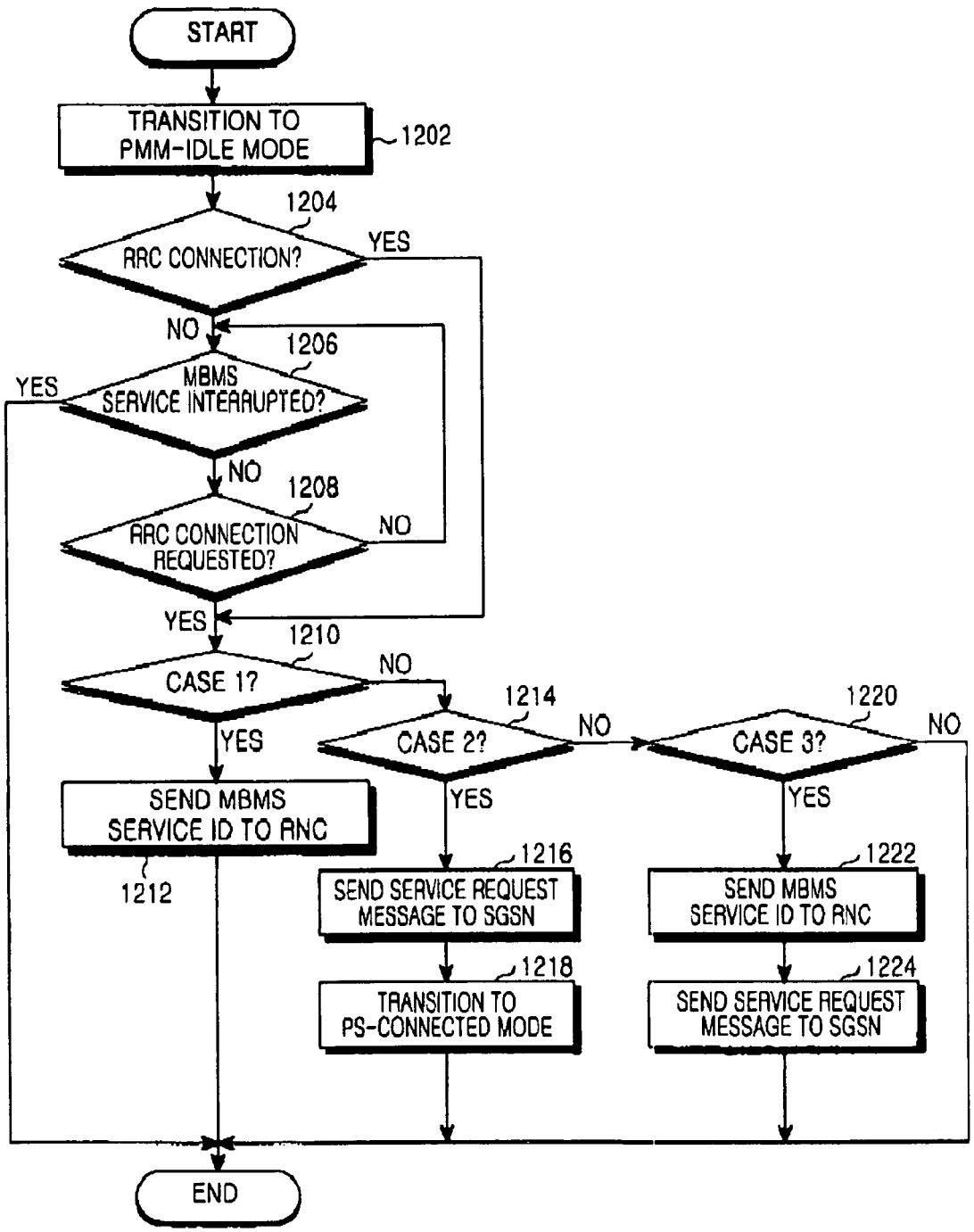
FIG. 25 is a flowchart illustrating a UE's operation for transmitting MBMS service-related information according to the second embodiment of the present invention.

FIG. 25 is a flowchart illustrating an operation of a UE according to the second embodiment of the present invention. Referring to FIG. 25, in step 1202, a UE transitions to a PMM-Idle mode after joining an MBMS service. In step 1204, the UE determines whether it has RRC connection. Because the UE is in the PMM-Idle mode, if the UE has RRC connection, the RRC connection is for a CS service. If the UE has RRC connection, it proceeds to step 1210, but otherwise, the UE proceeds to step 1206.

In step 1206, the UE determines whether the MBMS service already joined by the UE is interrupted. If the MBMS service is not interrupted, the UE proceeds to step 1208, but if the MBMS service is interrupted, the UE ends the operation.

In step 1208, the UE determines whether to perform an RRC connection setup procedure. If the UE determines to perform the RRC connection setup procedure, the UE determines in steps 1210, 1214 and 1220, which case is present.

If it is determined in step 1210 that the UE follows Case 1, the UE proceeds to step 1212. Here, Case 1 represents an embodiment in which the UE directly stores MBMS service-related information in an RNC through a Uu message and the RNC transmits an Iu message to an SGSN to inform that the UE is performing an RRC connection setup procedure. In step 1212, the UE transmits to the RNC an RRC Connection Setup Request message or an RRC Connection Setup Complete message containing an MBMS service ID or an MBMS service activation indicator, in order to request the RNC to add information on the UE to an MBMS service context corresponding to the MBMS service that the UE is joining.

If it is determined in step 1210 that the UE does not follow Case 1, the UE determines in step 1214 whether it follows Case 2. If the UE follows Case 2, it proceeds to step 1216. Here, Case 2 represents an embodiment in which when the UE sets up RRC connection for a CS service, it transitions to a PMM-Connected state and informs the SGSN that the UE is performing an RRC connection setup procedure through a NAS interface using the existing MBMS UE Linking procedure. In step 1216, the UE transmits to the SGSN a Service Request message containing a parameter (for example, an MBMS service ID or an MBMS service activation indicator) indicating the MBMS service. In step 1218, the UE transitions to a PMM-Connected mode, and then ends the operation.

However, if it is determined in step 1214 that the UE does not follow Case 2, the UE determines in step 1220 whether it will follow Case 3. If the UE follows Case 3, it proceeds to step 1222. In step 1222, the UE transmits to the RNC an RRC Connection Setup Request message or an RRC Connection Setup Complete message containing an MBMS service ID or an MBMS service activation indicator, in order to request the RNC to add information on the UE to an MBMS service context corresponding to the MBMS service that the UE is joining. In step 1224, the UE transmits a Service Request message and a parameter (for example, an MBMS service ID) indicating the MBMS service, including information indicating that the UE is a CMM-Connected mode, to the SGSN through a NAS interface.

As can be appreciated from the foregoing description, when UEs having joined an MBMS service are in an RRC-Connected mode after setting up a call for a CS service or a PS service, the present invention prevents the UEs from failing to receive a notification for paging of the MBMS service in providing the MBMS service, thereby increasing success rate and reliability of MBMS paging. According to the present invention, when a UE is in a PMM-Idle/RRC-Connected mode, MBMS service linking information of the UE in an RNC and an SGSN is held in providing an MBMS service, making it possible to efficiently provide the MBMS service.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for providing MBMS (Multimedia Broadcast/Multicast Service) services to User Equipments (UEs), in a mobile communication system including a Node B, a plurality of the UEs capable of communicating with the Node B in a cell occupied by the Node B, and a radio network controller (RNC) for controlling communication of the Node B, a serving GPRS (General Packet Radio Service) support node (SGSN) for managing the RNC, and the UEs to provide a packet switched (PS) service and a circuit switched (CS) service to the UEs, the method comprising the steps of:

transmitting MBMS service-related information of a UE that is in a Radio Resource Control (RRC) connected mode and a Packet Mobility Management-Idle (PMM-Idle) state after joining at least one MBMS service, from the UE to the RNC; and receiving MBMS service by the UE according to the MBMS service-related information to enable the UE to inform the RNC that the user has joined at least one MBMS service.

2. The method of claim 1, wherein the MBMS service-related information includes an MBMS Joined indication that the user of the UE in the PMM Idle state and the RRC connected mode has joined at least one MBMS service.

3. The method of claim 1, wherein the MBMS service-related information includes a service activation indicator for indicating that the UE has joined a certain MBMS service.

4. The method of claim 1, further comprising the step of authenticating, by the RNC, the UE, in between the RNC and the SGSN.

5. The method of claim 1, wherein the step transmitting the MBMS service-related information comprises the step of transmitting an RRC (Radio Resource Control) connection setup message containing a service identity (ID) for the at least one MBMS service that the UE has joined, from the UE to the RNC, during an RRC connection setup procedure between the UE and the RNC.

6. The method of claim 5, further comprising the steps of:
transmitting, by the RNC, a validate request message containing an ID of the UE to the SGSN managing the RNC; and
receiving from the SGSN a validate response message indicating whether the UE has been validated.

7. The method of claim 6, wherein the validate request message further includes at least one of the service ID for the at least one MBMS service.

8. The method of claim 1, wherein the step of transmitting the MBMS service-related information comprises the step of transmitting a service request message containing a service identity (ID) for the at least one MBMS service that the UE has joined, from the UE to the RNC, after the UE sets up an RRC connection for one of the CS service and the PS service with the RNC.

9. The method of claim 8, further comprising the steps of:
transmitting, by the RNC, a validate request message containing an ID of the UE to the SGSN managing the RNC; and
receiving from the SGSN a validate response message indicating whether the UE has been validated.

10. The method of claim 9, wherein the validate request message further includes at least one of the service ID of the MBMS service.

11. A method for providing MBMS (Multimedia Broadcast/Multicast Service) services in a mobile communication system, the method comprising the steps of:
receiving, by a Radio Network Controller (RNC), a MBMS joined indication that a Packet Mobility Management-Idle (PMM-Idle) state User Equipment (UE) in a Radio Resource Control (RRC) connected mode has joined at least one MBMS service, from the UE;

transmitting, by the RNC, an MBMS service IDentity (ID) request message containing an ID of the UE to a serving GPRS (General Packet Radio Service) support node (SGSN) managing the RNC;

receiving, by the RNC, an MBMS service ID response message containing at least one service ID indicating at least one MBMS service that the UE has joined, from the SGSN; and providing MBMS service from the RNC to the UE according to the MBMS service ID response message.

12. The method of claim 11, further comprising the step of searching, by the SGSN, for the at least one service ID for the at least one MBMS service that the UE has joined, using the ID of the UE.

13. The method of claim 11, further comprising the steps of:

transmitting a service request message containing an MBMS service activation indicator indicating existence of a particular MBMS service that the UE has joined, from the UE to the RNC, after an RRC (Radio Resource Control) connection setup between the UE and the RNC is completed;

transmitting, by the RNC, a service list request message containing an ID of the UE to the SGSN managing the RNC; and receiving, by the RNC, a service list response message containing at least one service ID indicating the at least one MBMS service that the UE has joined, from the SGSN.

14. The method of claim 13, wherein the service list request message further includes an ID of the RNC.

15. The method of claim 13, further comprising the step of searching, by the SGSN, for the at least one service ID for the at least one MBMS service that the UE has joined, using the ID of the UE.

16. The method of claim 11, further comprising the steps of:

searching for a first service context for the at least one MBMS service that the UE has joined, and generating the first service context, if the first service context does not exist; and adding information about the UE to the first service context, if an identity (ID) of the UE is not included in the first service context.

17. A method for providing MBMS (Multimedia Broadcast/Multicast Service) services to User Equipments (UEs), in a system including a Node B, a plurality of the UEs capable of communicating with the Node B in a cell occupied by the Node B, a radio network controller (RNC) for controlling communication of the Node B and the UEs to provide one of a packet switched (PS) service and a circuit switched (CS) service to the UEs, and a serving GPRS (General Packet Radio Service) support node (SGSN) for managing the RNC, the method comprising the steps of:

transmitting MBMS service-related information of a UE that is in a Packet Mobility Management-Idle (PMM-Idle) mode after joining at least one MBMS service, from the UE to the SGSN;

linking the MBMS service-related information with information about the UE; and storing the MBMS service-related information linked to the information about the UE in a first service context for the at least one MBMS service in the SGSN.

18. The method of claim 17, wherein the step of storing the MBMS service-related information comprises the step of adding information about the UE that transmitted the MBMS service-related information, to the first service context.

19. The method of claim 17, wherein the MBMS service-related information includes at least one service identity (ID) for the at least one MBMS service that the UE has joined.

20. The method of claim 17, wherein the MBMS service-related information includes a service activation indicator for indicating that the UE has joined a certain MBMS service.

21. The method of claim 17, wherein the information about the UE includes at least one of an ID of the UE and state information of the UE.

22. The method of claim 17, wherein the step of transmitting the MBMS service-related information comprises the steps of:
    transmitting an RRC (Radio Resource Control) connection setup message containing a service ID for the at least one MBMS service that the UE has joined, from the UE to the RNC, during an RRC connection setup procedure between the UE and the RNC;
    transmitting, by the RNC, a validate request message containing an ID of the UE to the SGSN; and
    receiving from the SGSN a validate response message indicating whether the UE has been validated.

23. The method of claim 22, wherein the validate request message further includes the service ID of the MBMS.

24. The method of claim 17, wherein the step of transmitting the MBMS service-related information comprises the step of transmitting a service request message containing a service identity (ID) for the at least one MBMS service that the UE has joined, from the UE to the SGSN, after the UE sets up an RRC (Radio Resource Control) connection for one of the CS service and the PS service with the RNC.

25. The method of claim 24, further comprising the steps of:
    transmitting, by the SGSN, a linking request message containing the service ID to the RNC;
    adding, by the RNC, the information about the UE to a second service context for the service ID in response to the linking request message; and
    transmitting, by the RNC, a linking response message corresponding to the linking request message to the SGSN.

26. The method of claim 17, wherein the step of transmitting the MBMS service-related information comprises the steps of:
    transmitting an RRC (Radio Resource Control) connection setup message containing an MBMS service activation indicator indicating existence of a particular MBMS service that the UE has joined, from the UE to the RNC, during an RRC connection setup procedure between the UE and the RNC;
    transmitting, by the RNC, a service list request message containing an identity (ID) of the UE to the SGSN; and
    receiving, by the RNC, a service list response message containing at least one service ID indicating the at least one MBMS service that the UE has joined, from the SGSN.

27. The method of claim 26, wherein the service list request message further includes an ID of the RNC.

28. The method of claim 17, wherein the step of transmitting the MBMS service-related information comprises the steps of:
    transmitting a service request message containing an MBMS service activation indicator indicating existence of a particular MBMS service that the UE has joined, from the UE to the SGSN, after an RRC (Radio Resource Control) connection setup between the UE and the RNC is completed; and
    searching, by the SGSN, for a service identity (ID) for the at least one MBMS service that the UE has joined, using an ID of the UE.

29. The method of claim 17, wherein the step of transmitting the MBMS service-related information comprises the steps of:
    searching for the first service context for the at least one MBMS service that the UE has joined, and generating the first service context, if the first service context does not exist; and
    adding the information about the UE to the first service context, if the ID of the UE is not included in the first service context.

* * * * *